(12) United States Patent
Kakuta et al.

(10) Patent No.: US 12,197,806 B2
(45) Date of Patent: Jan. 14, 2025

(54) CONTENT OUTPUT CONTROL DEVICE, CONTENT OUTPUT CONTROL METHOD, AND NON-TRANSITORY COMPUTER READABLE STORAGE MEDIUM

(71) Applicant: DENSO CORPORATION, Kariya (JP)

(72) Inventors: Yukari Kakuta, Kariya (JP); Kentaro Teshima, Kariya (JP); Daiki Kawashima, Kariya (JP); Takuya Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/453,275

(22) Filed: Aug. 21, 2023

(65) Prior Publication Data

US 2023/0393797 A1     Dec. 7, 2023

Related U.S. Application Data

(63) Continuation of application No. PCT/JP2022/003091, filed on Jan. 27, 2022.

(30) Foreign Application Priority Data

Feb. 25, 2021    (JP) .................................. 2021-028655

(51) Int. Cl.
     *G06F 3/14*      (2006.01)
(52) U.S. Cl.
     CPC .................................. *G06F 3/1423* (2013.01)
(58) Field of Classification Search
     CPC ........ B60K 35/00; B60K 35/22; B60K 35/28; B60K 2360/167; B60K 35/81;

(Continued)

(56) References Cited

U.S. PATENT DOCUMENTS 10,008,183 B2 *   6/2018   Ueda .......................... G06F 3/14
2014/0285398 A1     9/2014   Ueda et al.
(Continued)

FOREIGN PATENT DOCUMENTS

JP     2013109754 A    6/2013
JP     2019192001 A    10/2019
(Continued)

OTHER PUBLICATIONS

U.S. Appl. No. 18/461,348, filed Sep. 5, 2023, Kondo et al.

*Primary Examiner* — Koosha Sharifi-Tafreshi
(74) *Attorney, Agent, or Firm* — Harness, Dickey & Pierce, P.L.C.

(57) ABSTRACT

A content output control device includes: a memory that stores a rule definition including: an arbitration policy when contents are assigned to areas or zones; and a constraint expression; an arbitration unit that arbitrates the contents according to the rule definition to satisfy a rule-based arbitration upon receiving an output request from an application; and an output control unit that controls an output of the contents assigned to the areas or the zones. When one area or zone is re-arbitrated, the arbitration unit re-arbitrates a different one area specified as an influence area that influences the one area due to an re-arbitration thereof, or a different one zone specified as an influence zone that influences the one zone due to an re-arbitration thereof.

7 Claims, 24 Drawing Sheets

(58) Field of Classification Search
CPC .. B60K 35/10; B60K 35/29; B60K 2360/166; B60K 2360/182; B60K 2360/1523; B60K 2360/186; B60K 2360/164; B60K 2360/184; G06F 3/14; G06F 3/1423; G06F 3/0481; G06F 3/147; G06F 9/451; G06F 9/48; G09G 5/14; G09G 2380/10; G09G 5/38; G09G 2354/00; G09G 5/001; B60R 16/02
USPC .......................................................... 345/1.1
See application file for complete search history.

(56) References Cited

U.S. PATENT DOCUMENTS

| | | |
|---|---|---|
| 2014/0327533 A1 | 11/2014 | Ueda et al. |
| 2021/0031629 A1 | 2/2021 | Kato |
| 2021/0097963 A1 | 4/2021 | Kawashima et al. |

FOREIGN PATENT DOCUMENTS

| | | | |
|---|---|---|---|
| JP | 2020003649 A | 1/2020 | |
| WO | WO-2020003755 A1 * | 1/2020 | ............. B60K 37/06 |

* cited by examiner

FIG. 7

| P | Q | P→Q |
|---|---|---|
| true | true | true |
| true | false | false |
| false | true | true |
| false | false | true |

| P | Q | | P→Q |
|---|---|---|---|
| false | true | TRUE IN EITHER CASE | true |
| false | false | | true |

FIG. 21

| | ARB RESULT | LIST OF INFLU AREA |
|---|---|---|
| ARB OF AREA A | AREA A: a<br>AREA B: (NOT ARB YET)<br>AREA C: (NOT ARB YET) | AREA A: (NO INFLU)<br>AREA B: (NO INFLU)<br>AREA C: (NO INFLU) |
| ARB OF AREA B | AREA A: a<br>AREA B: b(HIDING)<br>AREA C: (NOT ARB YET) | AREA A: B(b IS HIDDEN)<br>AREA B: (NO INFLU)<br>AREA C: (NO INFLU) |
| ARB OF AREA C | AREA A: a<br>AREA B: b(HIDING)<br>AREA C: c<br>→ R SIDE OF IMPLI ALREADY DET | AREA A: B<br>AREA B: (NO INFLU)<br>AREA C: (NO INFLU) |
| RE-ARB OF AREA A | AREA A: a(HIDING)<br>AREA B: b(HIDING)<br>AREA C: c | AREA A: B<br>AREA B: (NO INFLU)<br>AREA C: A(a IS HIDDEN) |
| RE-ARB OF INFLU AREA B | AREA A: a(HIDING)<br>AREA B: b<br>AREA C: c | AREA A: (NO INFLU)<br>(CANCELLED SINCE RE-ARB)<br>AREA B: (NO INFLU)<br>AREA C: A |

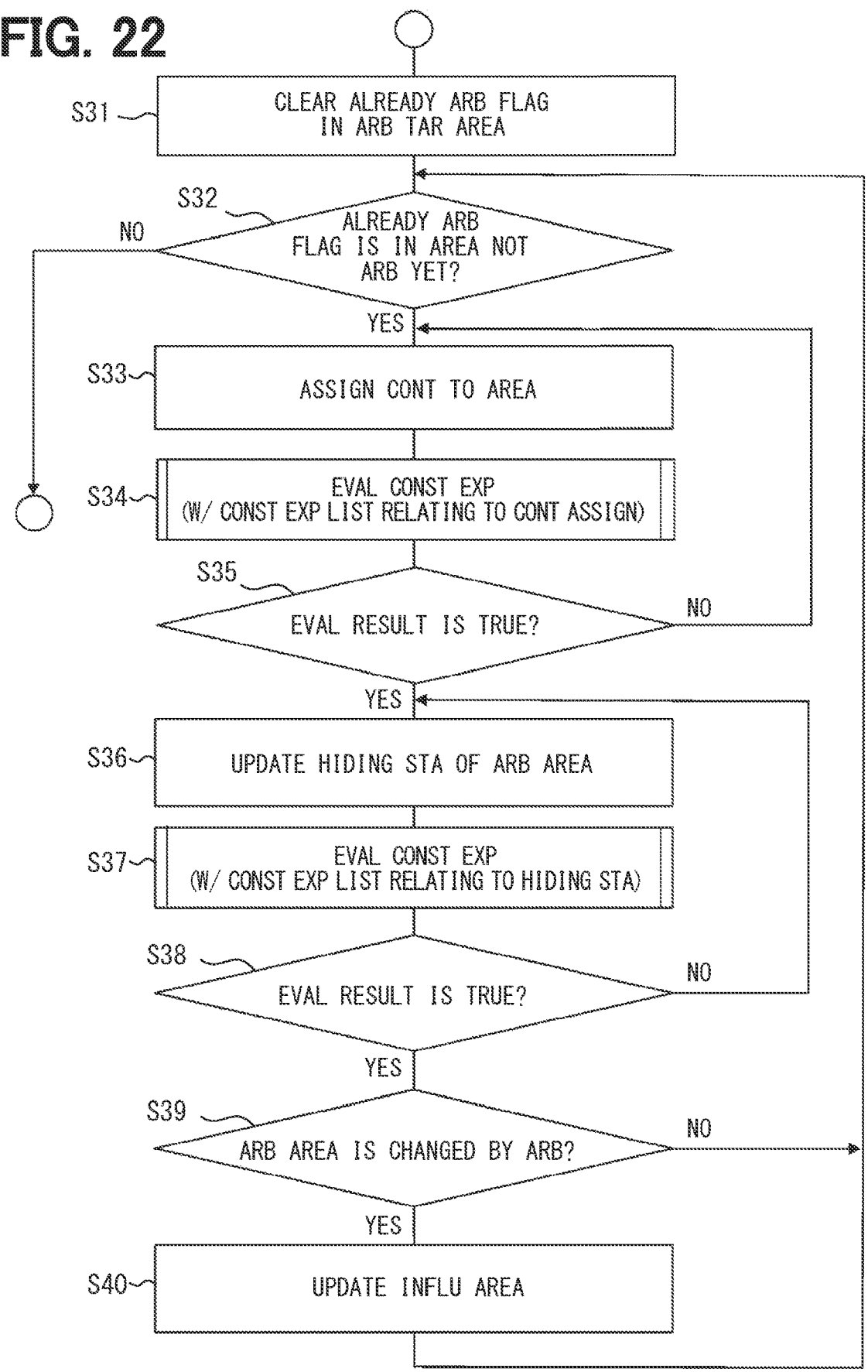

FIG. 24

| | ARB RESULT | LIST OF INFLU AREA |
|---|---|---|
| ARB OF AREA A ↓ | AREA A: a1<br>AREA B: (NOT ARB YET)<br>AREA C: (NOT ARB YET)<br>AREA D: (NOT ARB YET) | AREA A: (NO INFLU)<br>AREA B: (NO INFLU)<br>AREA C: (NO INFLU)<br>AREA D: (NO INFLU) |
| ARB OF AREA B ↓ | AREA A: a1<br>AREA B: b1<br>AREA C: (NOT ARB YET)<br>AREA D: (NOT ARB YET) | AREA A: (NO INFLU)<br>AREA B: (NO INFLU)<br>AREA C: (NO INFLU)<br>AREA D: (NO INFLU) |
| ARB OF AREA C ↓ | AREA A: a1<br>AREA B: b1<br>AREA C: c1<br>→ R SIDE OF IMPLI ALREADY DET<br>AREA D: (NOT ARB YET) | AREA A: C(ASSIGN OF c2 IS INFLUD)<br>AREA B: (NO INFLU)<br>AREA C: (NO INFLU)<br>AREA D: (NO INFLU) |
| RE-ARB OF AREA B ↓ | AREA A: a1<br>AREA B: b1(HIDING)<br>AREA C: c1<br>AREA D: (NOT ARB YET) | AREA A: C<br>AREA B: (NO INFLU)<br>AREA C: B(B IS HIDDEN)<br>AREA D: (NO INFLU) |
| ARB OF AREA D ↓ | AREA A: a1<br>AREA B: b1(HIDING)<br>AREA C: c1<br>AREA D: d1<br>→ R SIDE OF IMPLI ALREADY DET | AREA A: C<br>AREA B: (NO INFLU)<br>AREA C: B<br>AREA D: (NO INFLU) |
| RE-ARB OF AREA A ↓ | AREA A: a1(HIDING)<br>AREA B: b1(HIDING)<br>AREA C: c1<br>AREA D: d1 | AREA A: C<br>AREA B: (NO INFLU)<br>AREA C: B<br>AREA D: A(A IS HIDDEN) |
| RE-ARB OF INFLU AREA C ↓ | AREA A: a1(HIDING)<br>AREA B: b1(HIDING)<br>AREA C: c2<br>AREA D: d1 | AREA A: (NO INFLU) (CANCELLED SINCE RE-ARB)<br>AREA B: (NO INFLU)<br>AREA C: B<br>AREA D: A |
| RE-ARB OF INFLU AREA B ↓ | AREA A: a1(HIDING)<br>AREA B: b1~~(HIDING)~~<br>AREA C: c2<br>AREA D: d1 | AREA A: (NO INFLU)<br>AREA B: (NO INFLU)<br>AREA C: (NO INFLU) (CANCELLED SINCE RE-ARB)<br>AREA D: A |

FIG. 26

| | ARB RESULT | LIST OF INFLU AREA |
|---|---|---|
| ARB OF AREA A ↓ | AREA A: a<br>AREA B: (NOT ARB YET)<br>AREA C: (NOT ARB YET) | AREA A: (NO INFLU)<br>AREA B: (NO INFLU)<br>AREA C: (NO INFLU) |
| ARB OF AREA B ↓ | AREA A: a<br>AREA B: b(HIDING)<br>AREA C: (NOT ARB YET) | AREA A: B(b IS HIDDEN)<br>AREA B: (NO INFLU)<br>AREA C: (NO INFLU) |
| ARB OF AREA C ↓ | AREA A: a<br>AREA B: b(HIDING)<br>AREA C: c<br>→R SIDE OF IMPLI ALREADY DET | AREA A: B<br>AREA B: (NO INFLU)<br>AREA C: (NO INFLU) |
| RE-ARB OF AREA A ↓ | AREA A: a(HIDING)<br>AREA B: b(HIDING)<br>AREA C: c | AREA A: B<br>AREA B: (NO INFLU)<br>AREA C: A(a IS HIDDEN) |
| RE-ARB OF INFLU AREA B ↓ | AREA A: a(HIDING)<br>AREA B: b<br>→R SIDE OF IMPLI ALREADY DET<br>AREA C: c | AREA A: (NO INFLU)<br>(CANCELLED SINCE RE-ARB)<br>AREA B: (NO INFLU)<br>AREA C: A |
| RE-ARB OF AREA C ↓ | AREA A: a(HIDING)<br>AREA B: b<br>AREA C: c(HIDING) | AREA A: (NO INFLU)<br>AREA B: C(c IS HIDDEN)<br>AREA C: A |
| ✗ RE-ARB OF INFLU AREA A | AREA A: a<br>→R SIDE OF IMPLI ALREADY DET<br>AREA B: b<br>AREA C: c(HIDING) | AREA A: (NO INFLU)<br>AREA B: C<br>AREA C: (NO INFLU)<br>(CANCELLED SINCE RE-ARB) |

INFLU AREA A IS NOT RE-ARB

CONTENT OUTPUT CONTROL DEVICE, CONTENT OUTPUT CONTROL METHOD, AND NON-TRANSITORY COMPUTER READABLE STORAGE MEDIUM

CROSS REFERENCE TO RELATED APPLICATIONS

The present application is a continuation application of International Patent Application No. PCT/JP2022/003091 filed on Jan. 27, 2022, which designated the U.S. and claims the benefit of priority from Japanese Patent Application No. 2021-028655 filed on Feb. 25, 2021. The entire disclosures of all of the above applications are incorporated herein by reference.

TECHNICAL FIELD

The present disclosure relates to a content output control device, a content output control method, and non-transitory computer readable storage medium.

BACKGROUND

In rule-based arbitration (references: arbitration logic specification in US 2014/0285398-A1 and US 2014/0327533-A1 and rule-based syntax definition in US 2021/0031629 A1, which are incorporated herein by reference), areas or zones are defined as the arbitration target in descending order of value of the areas or the zones by one-pass logic, and content is assigned to each area or zone. The constraint expressions are evaluated after assigning the content, when all the constraint expressions are true (i.e., satisfied), the content assignment is successful, and when any constraint expression is false (i.e., not satisfied), the next content is assigned and the constraint expressions are evaluated again. When the content is not assigned to the area or the zone, or when not content is capable of being assigned to the area or the zone, it moves to the next area or zone. In this case, it may not be possible to obtain the result as intended by the specification developer who wants to design that the right side is established after the left side is established, since there is no weight on the right side and the left side. On the other hand, according to a conceivable technique, when the left side of the constraint expression is established and the right side has already been determined, the logic of re-arbitrating the area or zone on the right side is used.

SUMMARY

According to an example, a content output control device may include: a memory that stores a rule definition including: an arbitration policy when contents are assigned to areas or zones; and a constraint expression; an arbitration unit that arbitrates the contents according to the rule definition to satisfy a rule-based arbitration upon receiving an output request from an application; and an output control unit that controls an output of the contents assigned to the areas or the zones. When one area or zone is re-arbitrated, the arbitration unit re-arbitrates a different one area specified as an influence area that influences the one area due to an re-arbitration thereof, or a different one zone specified as an influence zone that influences the one zone due to an re-arbitration thereof.

BRIEF DESCRIPTION OF THE DRAWINGS

The above-described object and other objects, features and advantages of the present disclosure will become more apparent from the following detailed description with reference to the accompanying drawings. In the drawings:

FIG. 7 is a diagram showing the definition of truth values;

FIG. 21 is a diagram showing a list of arbitration results and influence areas;

FIG. 22 is a flowchart (part 1) showing an area registration process during the arbitration;

FIG. 24 is a diagram showing a list of arbitration results and influence areas;

FIG. 26 is a diagram showing a list of arbitration results and influence areas.

DETAILED DESCRIPTION

Here, even when the arbitration logic according to the conceivable technique is performed, it may not be possible to obtain the result as intended by the specification developer. This is because when the state of an area or a zone changes due to the re-arbitration, the restrictions on the area or the zone, which has been restricted by the state of the re-arbitrated area or the re-arbitrated zone before the re-arbitration, are cancelled. However, it is not possible to obtain a result that takes into account the canceled constraint. Under such circumstances, when the state of the area or the zone changes due to re-arbitration, it is necessary to establish a mechanism for re-arbitrating the area or the zone, which is restricted by the state of the re-arbitrated area or the re-arbitrated zone before the re-arbitration.

An object of the present embodiments is to appropriately obtain the results intended by the specification developer when the state of the area or zone changes due to the re-arbitration.

According to one aspect of the present embodiments, the memory stores rule definitions including arbitration policies that define basic arbitration when assigning content to areas or zones, and constraint expressions. Upon receiving an output request from an application, the arbitration unit performs arbitration so as to satisfy rule-based arbitration according to rule definitions. The output control unit controls the output of the content assigned to the area or the zone by the arbitration performed by the arbitration unit. The arbitration unit, when re-arbitrating an area or a zone, re-arbitrates the area specified as the influence area or the zone specified as the influence zone.

When re-arbitrating the area or the zone, by re-arbitrating the area specified as the influence area or the zone specified as the influence zone that has an influence due to the re-arbitration, the restriction of the area or the zone, which has been restricted by the state before there-arbitration, is cancelled, and it is possible to obtain the result that takes into account the canceled constraint. As a result, when the state of the area or the zone changes due to the re-arbitration, the result intended by the specification developer can be appropriately obtained.

Figure 2:
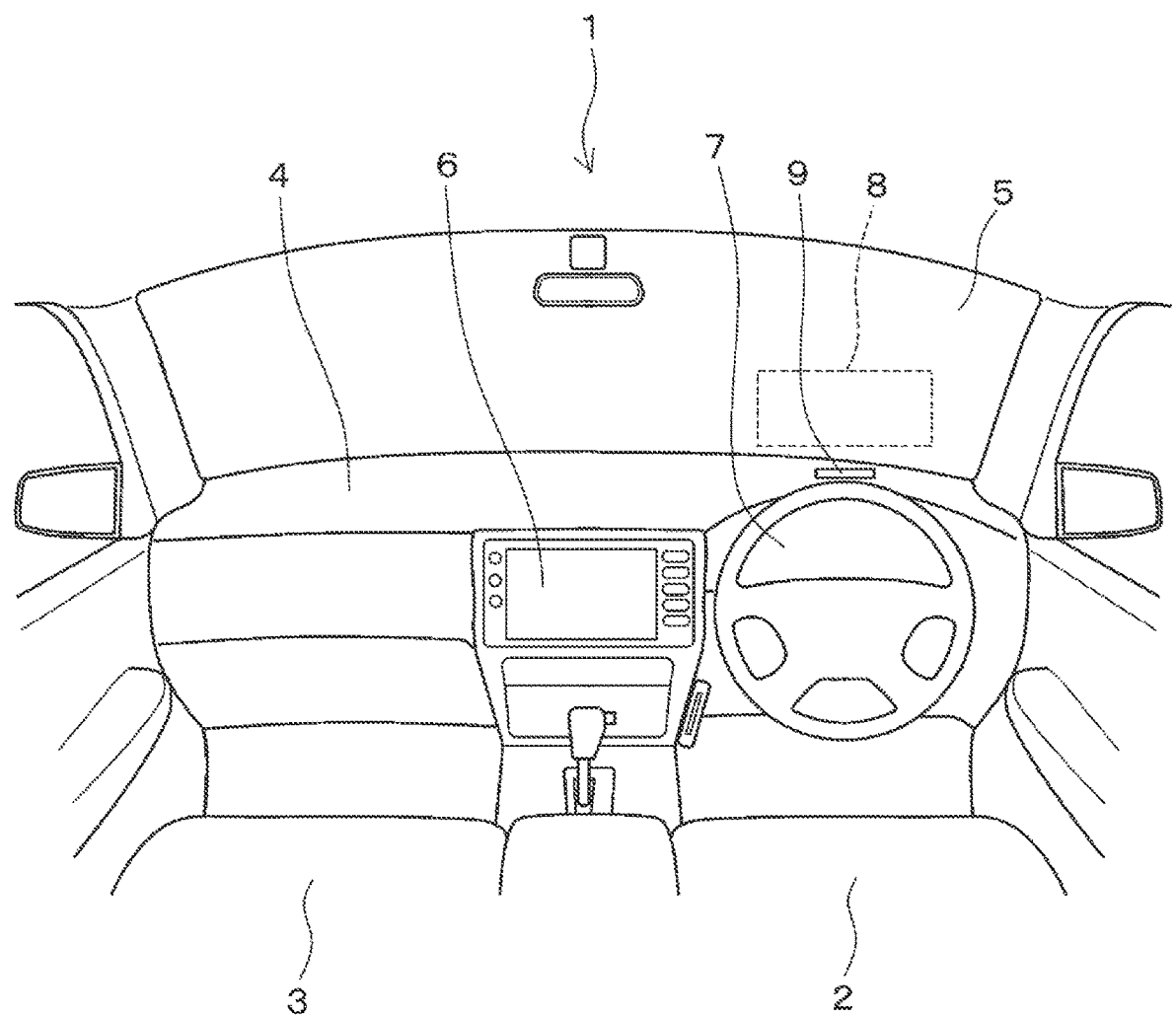
FIG. 2 is a perspective view showing a vehicle compartment.

Hereinafter, one embodiment will be described with reference to the drawings. In this embodiment, a mode in which content is displayed in an area will be described, alternatively, a mode in which content is output as audio in a zone may be also applicable. That is, content output includes both the concept of content display and audio output, and output content includes the concept of both displayed content and audio output content. As shown in FIG. 2, a driver seat 2 and a passenger seat 3 are arranged in the vehicle compartment 1 of the vehicle, and an instrument panel 4 is arranged in front of them. A windshield 5 is mounted on the front end of the instrument panel 4 so as to stand up. A first display device 6 and a second display device 7 are arranged on the instrument panel 4, and a third display device 8 is arranged on the windshield 5.

The first display device 6 is, for example, a center display including a full-color liquid crystal display device, and basically functions as a display unit for displaying non driving-related content that is not related to vehicle traveling control. The non-driving related content includes, for example, map information for navigation, audio information, telephone information, and the like. The first display device 6 also functions as a display unit that displays an image of the rear of the vehicle captured by the rear camera when the vehicle is moving backward.

The second display device 7 is, for example, a meter display including a full-color liquid crystal display device, and basically functions as a display unit for displaying power train content that is related to vehicle traveling control. The content of the power train is, for example, vehicle speed, engine speed, shift position, remaining amount of fuel, and the like.

The third display device 8 is a head-up display in which an image is projected from the display unit 9 arranged on the instrument panel 4 onto the windshield 5, and basically functions as a display unit that displays a driving related content, similar to the second display device 7. Each of the display devices 6 to 8 includes one or a plurality of areas for displaying the content. In such a configuration, content is displayed on each of the display devices 6 to 8, thereby providing the occupant with various types of information including the driving related content and non-driving related content.

Figure 1:
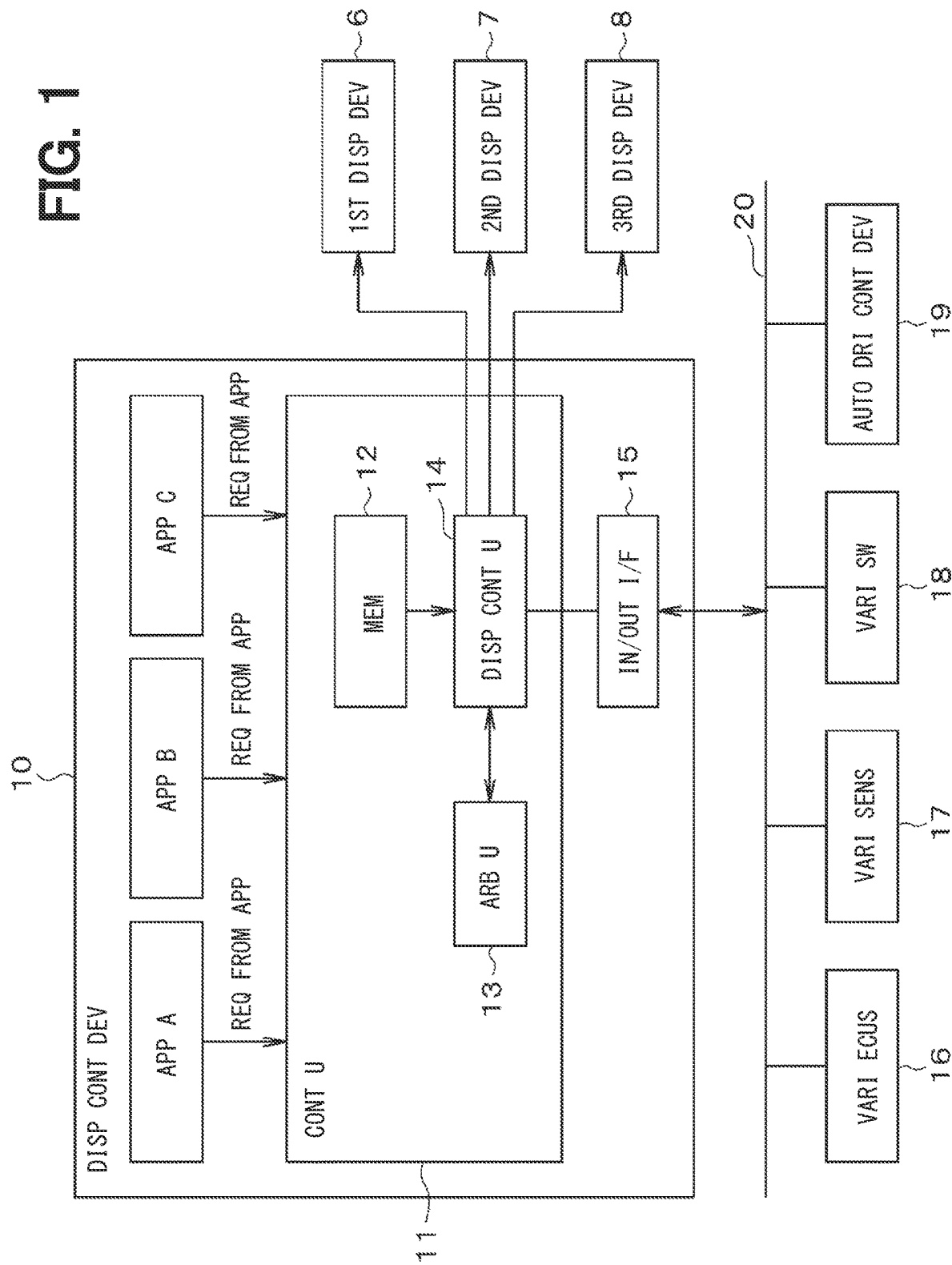
FIG. 1 is a functional block diagram showing a configuration of a display control device according to an embodiment.

As shown in FIG. 1, the display control device 10 has a control unit 11, and displays content in areas set in each of the display devices 6-8. The control unit 11 has a microcomputer including a CPU (Central Processing Unit), a ROM (Read Only Memory), a RAM (Random Access Memory), an I/O (Input/Output), and the like, and executes a display control program stored in a non-transitory tangible storage medium. The display control device 10 corresponds to a content output control device.

A plurality of applications A to C are stored in the display control device 10 in advance. When a content display request for a predetermined area of one or a plurality of display devices 6 to 8 is generated, each of the applications A to C provide to interrupt and output an APP (application) request indicating the display device as the display target device, an area, and a content to the control unit 11.

The control unit 11 includes a memory 12, an arbitration unit 13 and a display control unit 14. The display control unit 14 corresponds to an output control unit. The control unit 11 controls the operation of the display control device 10 by executing the output control program. The memory 12 stores rule definitions. The rule definitions include arbitration policies that define basic arbitration when content is assigned to an area, and constraint expressions that describe properties that should be satisfied exceptionally.

The arbitration policy is always set by any of priority arbitration, latter content win arbitration, and value-based arbitration, as will be described later. The constraint expression may not be limited to one, and may not be provided or may be provided with a plurality of equations according to the intention of the specification developer.

Upon receiving a display request from an application, the arbitration unit 13 arbitrates content according to rule definitions so as to satisfy rule-based arbitration. The display control unit 14 is connected to various ECUs 16, various sensors 17, various switches 18, an autonomous driving device 19 and the like via an input/output I/F 15 through an in-vehicle network 20 such as CAN (Controller Area Network). The display control unit 14 controls display of the content assigned to the predetermined area by the arbitration unit 13. Arbitration logic can be created as a library, and rule-based arbitration can be arbitrarily set by registering or changing rule definitions in the library.

When assigning content to areas, different applications may issue APP requests at the same time, in which case arbitration is required. Note that the words "at the same time" does not mean simultaneous in terms of time, but mean the state that, when an APP request is output from an application, the content of another application is already being displayed, i.e., the APP requests from two different applications are in active at the same time.

When the APP requests are turned on at the same time, the content to be displayed in the area needs to be arbitrated. In a configuration that defines all behaviors such as which content is displayed in which area, it becomes difficult to define all behaviors when the number of contents increases. For this reason, in the present embodiment, the rule-based arbitration is adopted such that the rule-based arbitration abstractly indicates which content should be displayed in which area. The rule-based arbitration will be described below.

1. Rule-Based Arbitration (1) Rule Definition

The rule-based arbitration describes an arbitration method in which the content is arbitrated and allocated to an arbitrary area based on a predetermined rule. Area definitions, content definitions, and constraint expressions are required as rule definitions in rule-based arbitration.

(1-1) Area Definition

The area definition defines the display location, the value of the display location, and the arbitration policy. Since arbitration is performed for each area, an arbitration policy is defined for each area.

In the area, a frame for displaying the content on the display screens of the display devices 6 to 8 is defined. Only one content is assigned to an area.

Area is defined as follows.

(A) The assigned content is displayed in the area.
(B) The area has an arbitration policy.
(C) The area refers to the content that can be displayed.
(D) The area has one or more sizes.

Each area has a property. The priority, Z-order, arbitration policy, and size are set as properties.

(A) Priority

The priority is a value (in a range between 0% and 100%) indicating the value of the area itself. The arbitration is performed in order from the area with the highest priority value.

(B) Z Order

The Z-order is a coordinate with respect to a height. The higher the value, the closer to the front it is displayed. When there are areas with the same priority, arbitration is performed in descending order of this value.

(C) Arbitration Policy

The arbitration policy is one of priority arbitration, latter win arbitration, and value-based arbitration.

(C-1) Priority Arbitration

Figure 3:
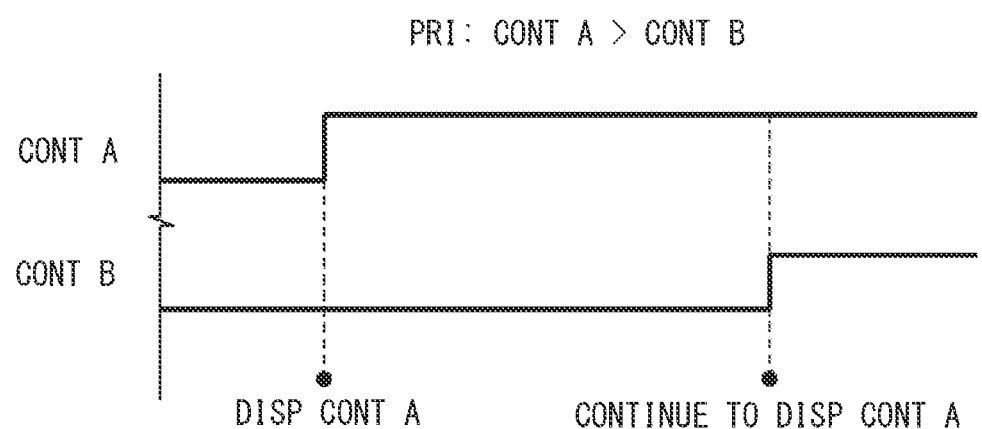
FIG. 3 is a diagram showing priority arbitration.

The priority arbitration is an arbitration policy for each area, and as shown in FIG. 3, it is arbitration that displays the content having the highest priority among the contents that can be displayed in the area.

(C-2) Latter Win Arbitration

Figure 4:
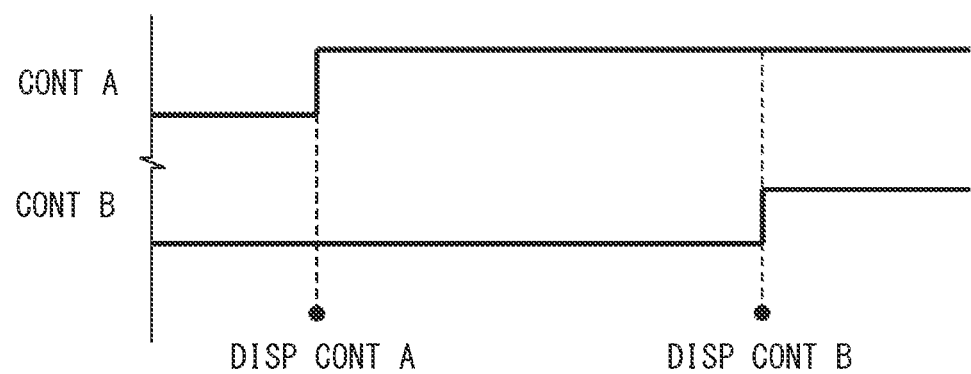
FIG. 4 is a diagram showing a latter-content-win arbitration.

The latter win arbitration is an area-based arbitration policy. As shown in FIG. 4, the content of the last request in the area is displayed, and when the display of the last request content is finished, the second last request among the remaining contents is displayed.

(C-3) Value-Based Arbitration

Value-based arbitration is an arbitration policy for the entire area, and is arbitration that displays the content that maximizes the calculated value obtained by multiplying the numerical value that quantifies the value of the content and the numerical value that quantifies the value of the area.

(D) Size

Figure 5:
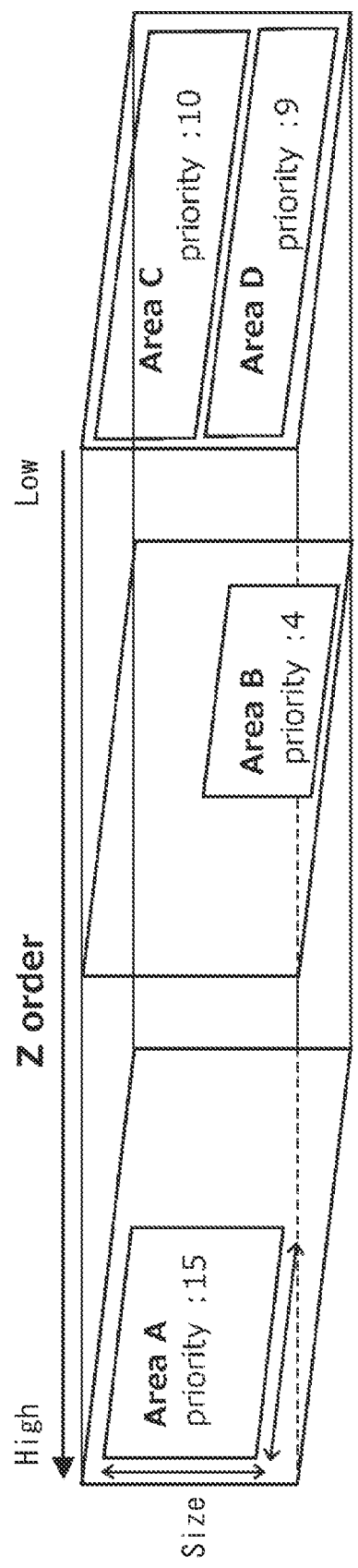
FIG. 5 is a diagram showing the relationship between the Z-order of an area and the priority.

The size is the size of the area, which is defined by a vertical size×a horizontal size. When multiple areas are defined, it is determined according to the size of the content. The relationship between the area Z-order and priority is as shown in FIG. 5.

(1-2) Content Definition

The content definition defines the displayable area, the state of the content, and the value of the state of the content. The content can have multiple states, the content is assigned to the area, and the content status is displayed. The content defines and refers to the area in which the content itself can be displayed.

In the content, the content to be displayed in the area defined on the display screens of the display devices 6 to 8 is defined. Only one content is assigned to an area.

Content is defined as follows.

(A) Content is assigned to the area.
(B) The content refers to one or more areas in which the content itself can be displayed.
(C) The content always has one or more states.
(D) Content has one or more sizes.

When there are a plurality of displayable areas, the content can be displayable in any one of areas, and one content can be displayed in a plurality of areas at the same time. One content can have a plurality of states, and when a plurality of states are held, each state is exclusive and can always be displayed only in one state at a time. The content can have multiple sizes, and when there are multiple sizes, the closest size is displayed according to the size of the display target area.

Figure 6:
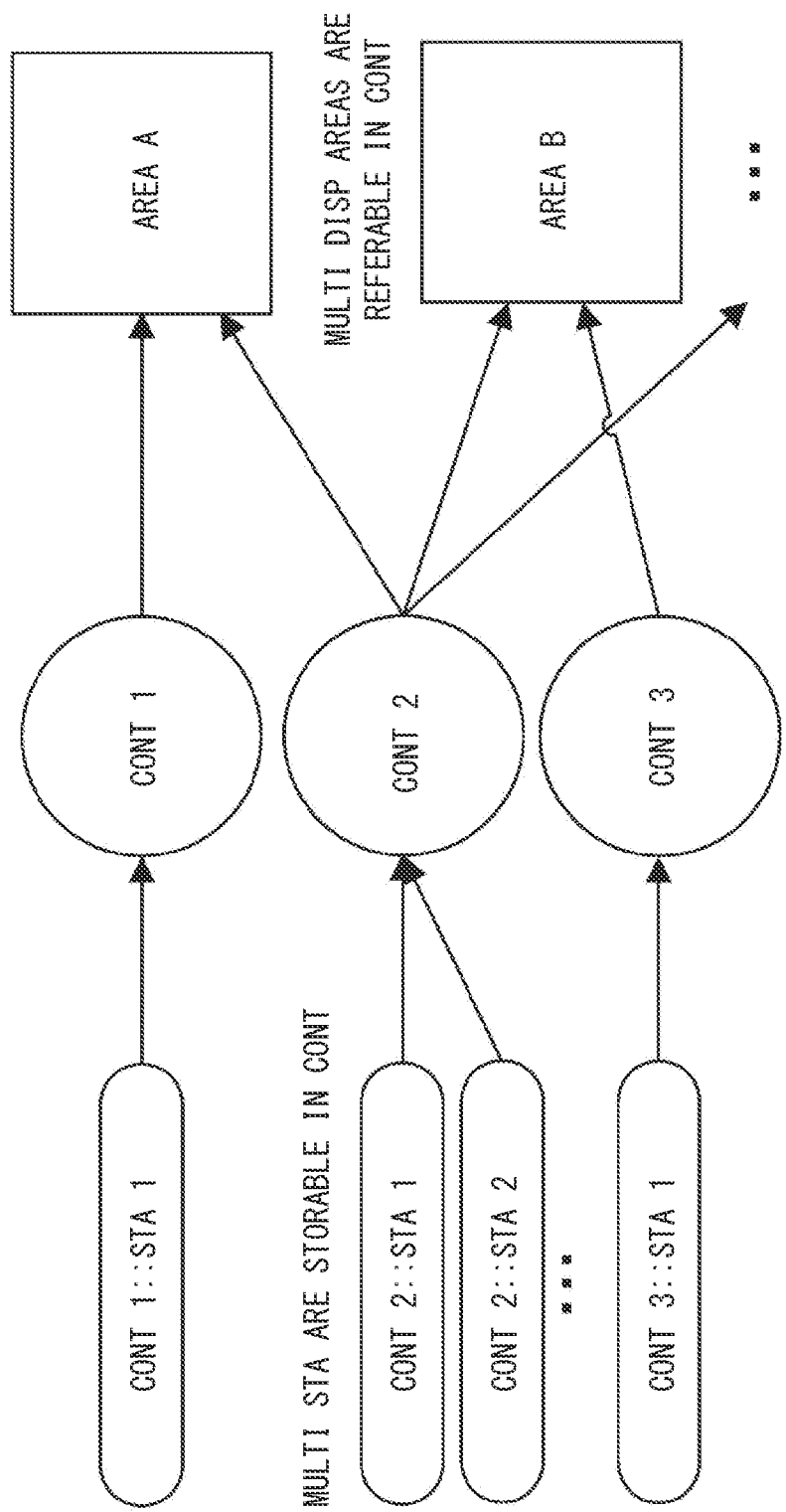
FIG. 6 is a diagram showing the relationship between a content, a state, and an area.

The relationship between a content, a state, and an area is linked as shown in FIG. 6.

The content has properties, and priority and whether or not to withdraw the APP request (i.e., good loser) when size arbitration is lost are set as the properties.

(A) Priority

The priority is a value used when the arbitration policy of the area is "priority arbitration", and the content having a high priority is assigned to the area first.

(B) Size

The size is the display size of the content and is defined by a vertical size×a horizontal size. When more than one sizes are defined, it is determined according to the size of the area.

(1-3) Constraint Expression

A constraint expression is a rule that describes the properties that must be exceptionally satisfied during or after arbitration. By suppressing the state of arbitration with a constraint expression, it is possible to express a state that cannot be expressed by the arbitration policy as it is, or to use it for determining the arbitration result after arbitration. That is, for example, depending on the situation such as the running state of the vehicle, it may be better not to display even the content assigned by the arbitration policy. The constraint expression defines the conditions for content suppression and area suppression, which are the conditions that the arbitration result must satisfy.

The logical expression that can be handled by the constraint expression are the content state, the area state, the content being displayed in the area, the set of the area and the content, the scene state, the logical operation, and the quantification symbol. The scene is, for example, a manual driving scene or an automatic driving scene by the autonomous driving device 19 and output control is possible in which the content of the manual driving content group is not displayed in the autonomous driving scene.

(A) The content state is either active/inactive or displayed/hidden.
(B) The state of the area is either displayed or hidden.
(C) The logical operations are NOT (!), AND, OR, implication (→), and equal sign (=).

The quantification symbol includes $\forall$ (For all: the condition is satisfied for all elements of the set) and $\exists$ (Exists: at least one element satisfying the condition exists in the set).

(D) Constraint Expression

The constraint expression affects the result of the arbitration logic, and the arbitration logic is set to satisfy all constraints.

(e) Post-Process

Post-processing has a property (i.e., good loser) that specifies the waiting for APP requests after arbitration in a particular content. It does not influence the result of the arbitration logic since only the wait state of the content after arbitration changes.

(1-4) Content Suppression

For example, "central area. displaying Content ( )=c1→!C2. is Visible ( )" is exemplified as a constraint expression that the content c2 is not displayed while the content c1 is being displayed. This constraint expression describes the suppression that the content c2 is not displayed when the content c1 is being displayed in the central area.

(1-5) Priority Arbitration and Latter Win Arbitration

When priority arbitration and latter win arbitration coexist, it is possible to handle them by setting the arbitration policy of the area to the latter win policy and by describing only the relationship between the contents related to the priority with a constraint equation.

As such a constraint expression, "TEL. is Active ( )→For All MM type interrupt (other than TEL) {x|!X. is Visible ( )}" is illustrated. The arbitration policy is the area of the latter win arbitration, and describes the suppression that all multimedia type interrupts (other than the telephone) are not displayed when the content with the high priority, i.e., the telephone, is active by adding this constraint equation.

(2) Arbitration Logic

The arbitration logic is an algorithm that defines how to allocate the content to satisfy a constraint equation based on an area arbitration policy according to a predetermined rule. Basically, each area is arbitrated in order of priority, but when it is determined that the constraint expression with the operator defined by implication is different from the specification developer's intention, the area is returned to the previous area and re-arbitration is performed.

The arbitration logic includes arbitration within the area and arbitration for the entire area.

(2-1) Arbitration in the Area (A) For arbitration within the area, the areas in the priority arbitration and the latter win arbitration are arbitrated in descending order of priority.

(B) Evaluate the following feature for each area.

Temporarily assign the highest priority content, and when the evaluation result of the constraint expression is true, determine the temporarily assigned content. When the evaluation result of the constraint expression is false, then re-evaluate the next highest priority content. When there is no content that satisfies the constraint expression, no content is displayed in that area.

(2-2) Arbitration of the Entire Area

The arbitration (i.e., value-based arbitration) for the entire area includes best fit logic and one pass logic.

(A) The best fit logic selects the highest total value among all the combinations of the contents satisfying the constraint expression and the areas.

(B) The one-pass logic assigns the content with the highest priority to the area in order from the area with the higher priority, and excludes the content already assigned to the other area. In this embodiment, the one-pass logic is adopted, alternatively, the best-fit logic may be adopted.

(2-3) Implications in Constraint Expressions

In the arbitration logic, the "implication" in the constraint expression has a meaning as a condition for re-arbitration, so the implication will be explained below.

The implication in proposition logic can be described as "P→Q", and the left side is defined as the premise part and the right side is the conclusion part. The definition of truth values (i.e., truth table) is as shown in FIG. 7.

In the axiom system in the proposition logic, the implication is defined as the expression of "P→Q≡¬P∨Q".

Figure 8:
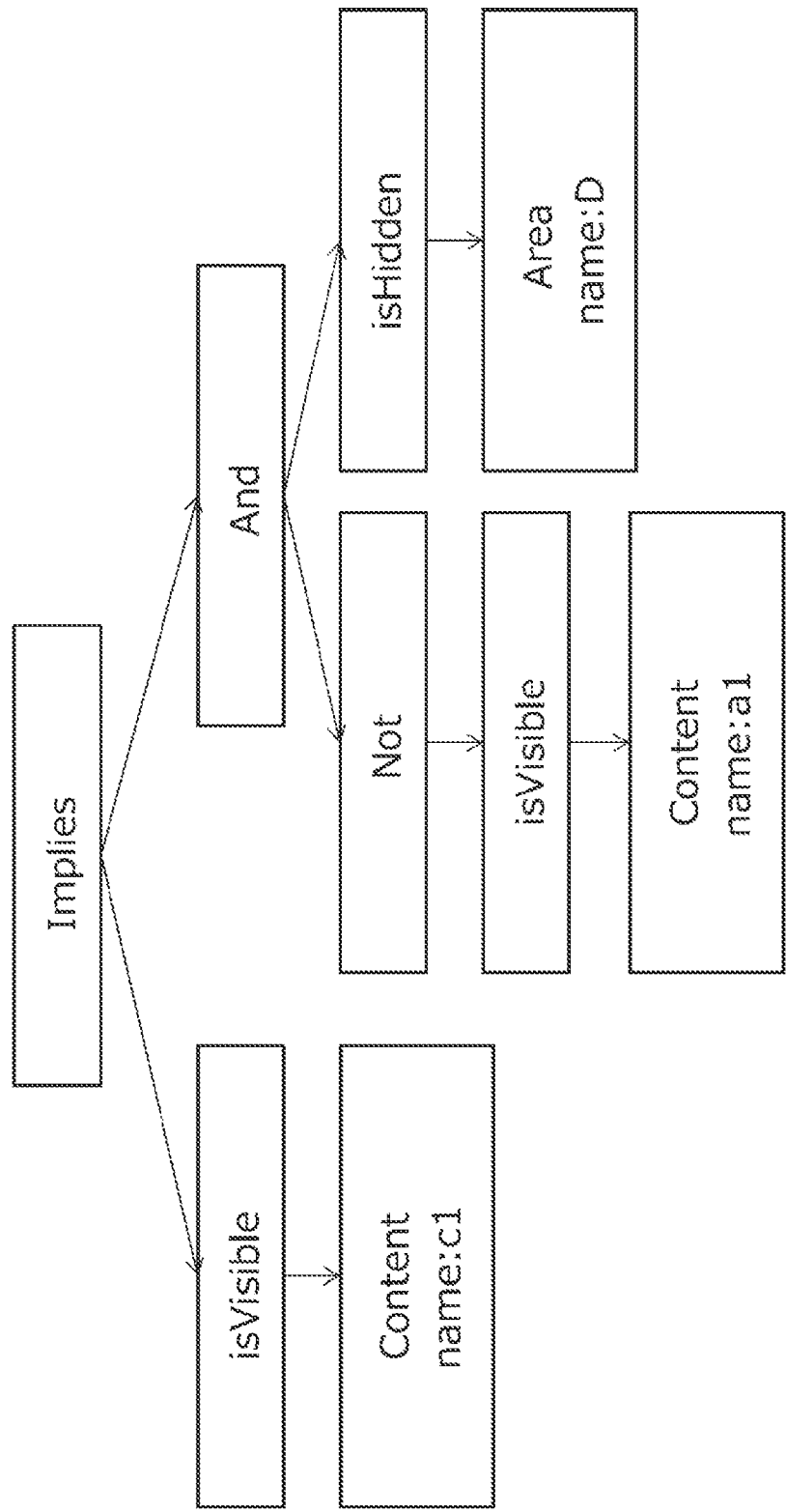
FIG. 8 is a diagram showing the data structure of a constraint expression object.

Also, since the data structure of the constraint expression object is a syntax tree as shown in FIG. 8, it is possible to determine the left side and the right side of the implication.

(2-4) Difference Between Intent and Logical Value in the Implication

The expression of "P→Q" is true when both P and Q are true. In other words, the constraint expression is true when P is false regardless of Q.

Figures 9, 10:
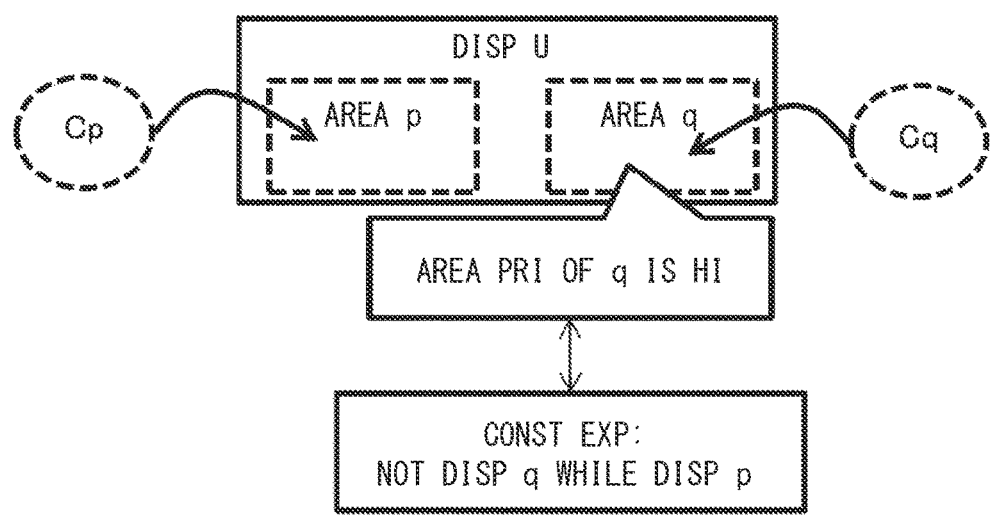
FIG. 9 is a diagram showing a truth value in a case where an evaluation value is true when the left side of the constraint expression is false.
FIG. 10 is a diagram showing the relationship between area priorities and constraint expressions.

When the implication is used in a constraint expression, the specification developer may often intend that "the right side is judged after the left side is established." That is, the implicit intention is that there is an order, and the right side is to be established after the left side is established. However, logically, after determining the truth of the right side of the implication, if the left side is set to false regardless of the truth of the right side, the result is true. This treatment has no problem in view of the logic, i.e., the semantic theory of the implication. This means that, in order to satisfy the constraint expression by the arbitration logic, the constraint expression can be satisfied by forcibly making all of the left side of the implication false, as shown in FIG. 9. The one-pass logic determines the content assigned to an area according to the priority order of the areas. That is, the left and right sides of the implication are not related. On the other hand, the intention of the constraint expression of implication is "when the right side is judged after the left side is established", and the left side and the right side of the implication are related. The purpose of re-arbitration is to solve this difficulty.

The re-arbitration of the constraint expression with the implication will now be described.

An example case is described such that a constraint expression is described as "P→Q" and an area p relates to P and an area q relates to Q as shown in FIG. 10. Note that the area priority is defined as "p<q".

A specific example of the constraint expression is "p. is Display ( )→q. is Hidden ( )", which means "do not display q while displaying p".

The arbitration logic will be described when there is a content Cp related to area p and a content Cq related to area q, and APP requests occur simultaneously.

(1) First, determine the content of the area q by one-pass logic. As a result, the content Cq is assigned to the area q. In this case, the evaluation of the constraint expression skips the area p since there is an unassigned area on the left side.

(2) The content of the area p as the next area is determined by the one-pass logic as follows. After tentatively assigning the content Cp to the area p, evaluate the constraint expression of "p. is Display( )→q. is Hidden ( )". In this case, since the evaluation is defined as "true→false", the evaluation result of the constraint expression is false. Since the right side of the implication (i.e., the area q) has been arbitrated, the area q is re-arbitrated. Specifically, the assignment of the content Cp is determined as proper, and the assignment of the content in area q is performed again.

(3) The content of area q, which is the next area, is determined as follows since the re-arbitration has been performed. When the content Cq is tentatively assigned to the area q, the evaluation is defined as "true→false", so that the tentative assignment of the content Cq is cancelled, and no content is assigned to the area q, and then, the process ends.

As a result of the above operation, while the content Cp is being displayed in the area P, the content assignment of the area q is eliminated, and the result as intended by the constraint expression is obtained.

Figure 11:
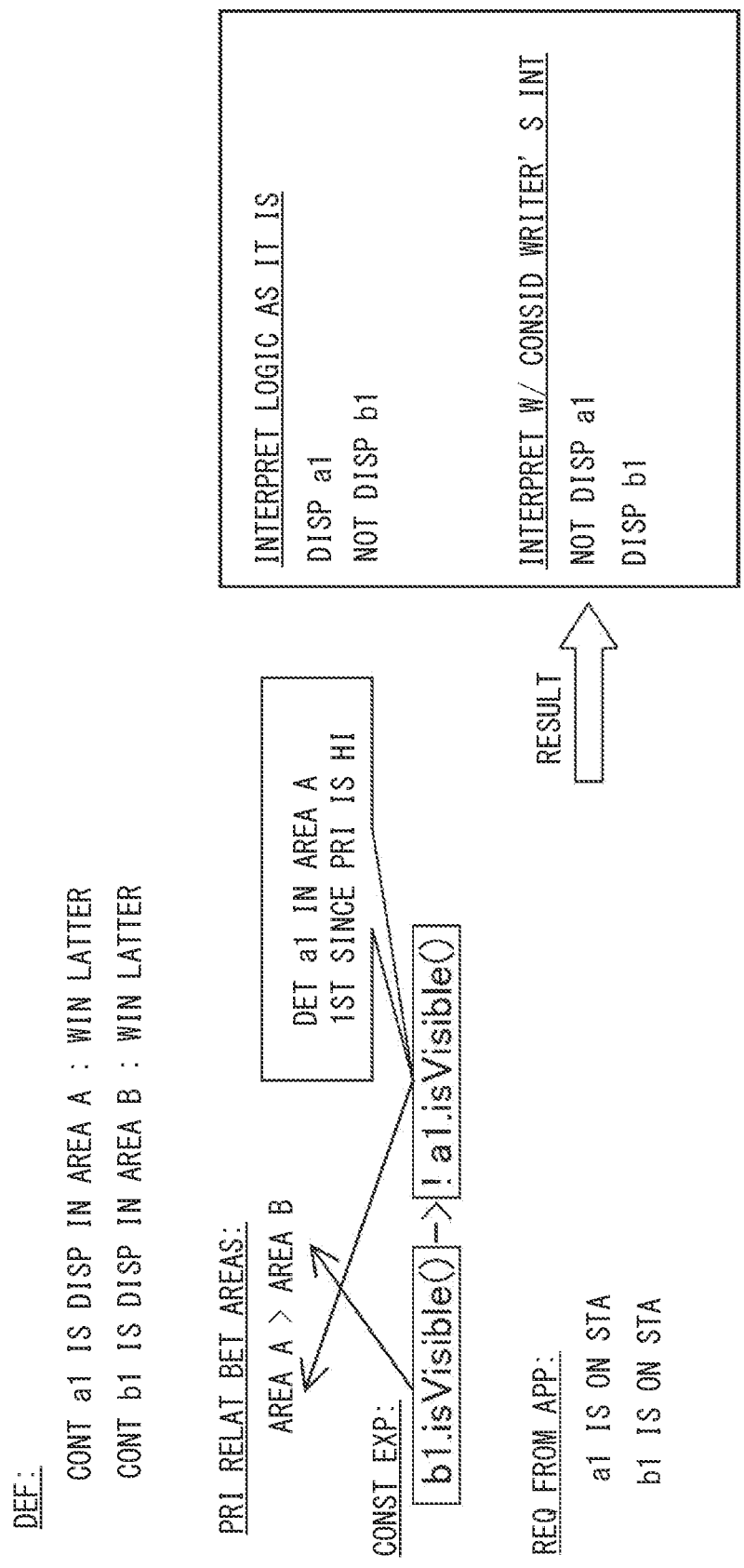
FIG. 11 is a diagram showing an example where the constraint expression is different from the specification developer's intention.

The arbitration logic evaluates the constraint expressions by arbitrating in order from the area with the highest priority. Thus, the right side of the implication (i.e., the conclusion part) may be determined first, and then the left side of the implication (i.e., the premise part) may be determined, according to the description method of the implication in the constraint expression and the level of the priority in the area. In such a case, if all of the left side is set to be false, it is logically correct, but there may be a gap with the specification developer's intention of "after the left side is established" as described above. As such an example, as shown in FIG. 11, the area A can display the content a1 and wins latter, the area B can display the content b1 and wins latter, and the priority relationship between areas is "area A>area B", and the constraint expression exemplifies "b1. is Visible ( )→!a1. is Visible". When the APP request is turned on in the order of the content a1 and the content b1, the content a1 is displayed in the area A and then the content b1 is displayed in the area B according to the latter-win arbitration policy. In this case, since the content a1 of the area A with a high priority is judged first, the right side of the constraint expression is judged first, and the right side of the constraint expression becomes false first. In this case, if the left side of the constraint expression is forcibly set to false, the evaluation result of the constraint expression becomes true. Therefore, if interpreted logically, the content a1 is determined to be displayed, and the content b1 is determined to be not display.

However, since the intention of the specification developer is to determine the not-display of the content a1 after the content b1 is determined to be displayed, the intention of the specification developer is not reflected. In other words, the arbitration logic should eliminate the gap between the intention of the specification developer and the arbitration behavior as much as possible. As a result, instead of applying arbitration in a one-way starting from the highest priority area, if the constraint expression becomes an unintended state as described above, it is necessary to perform a recursive arbitration logic that arbitrates again. For this reason, this embodiment employs the recursive arbitration logic.

(2-5) Behavior

The recursive arbitration logic includes an arbitration process that assigns the content to an area and a post-process that changes the state of the request after the arbitration process. It also evaluates all constraint expressions to check whether the arbitration process has been successful.

(A) Overall Arbitration Logic Behavior

Figure 12:
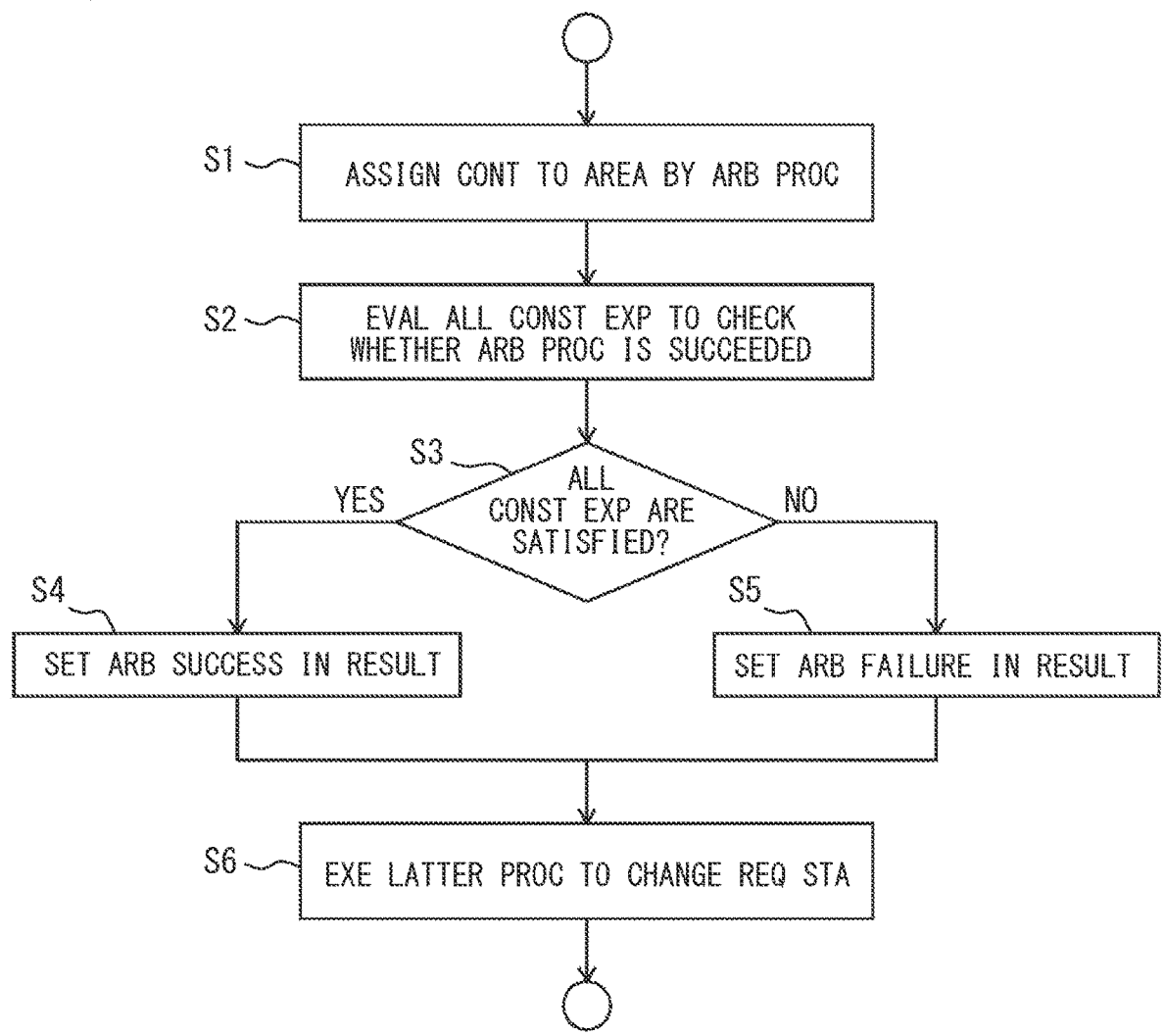
FIG. 12 is a flow chart showing the behavior of the overall arbitration logic.

As shown in FIG. 12, the display control device 10 performs arbitration processing, assigns contents to areas (at S1), evaluates all constraint expressions, and checks whether the arbitration processing has been successful (at S2). When the display control device 10 determines that all the constraint expressions have been satisfied and determines that the arbitration process has succeeded ("YES" at S3), it sets arbitration success to the result and confirms the arbitration (at S4). When the display control device 10 determines that any one of the constraint expressions is not satisfied and determines that the arbitration process has failed ("NO" at S3), it sets arbitration failure to the result (at S5). The display control device 10 performs post-processing and changes the state of the request (at S6).

(B) Operation of Arbitration Process

Figure 13:
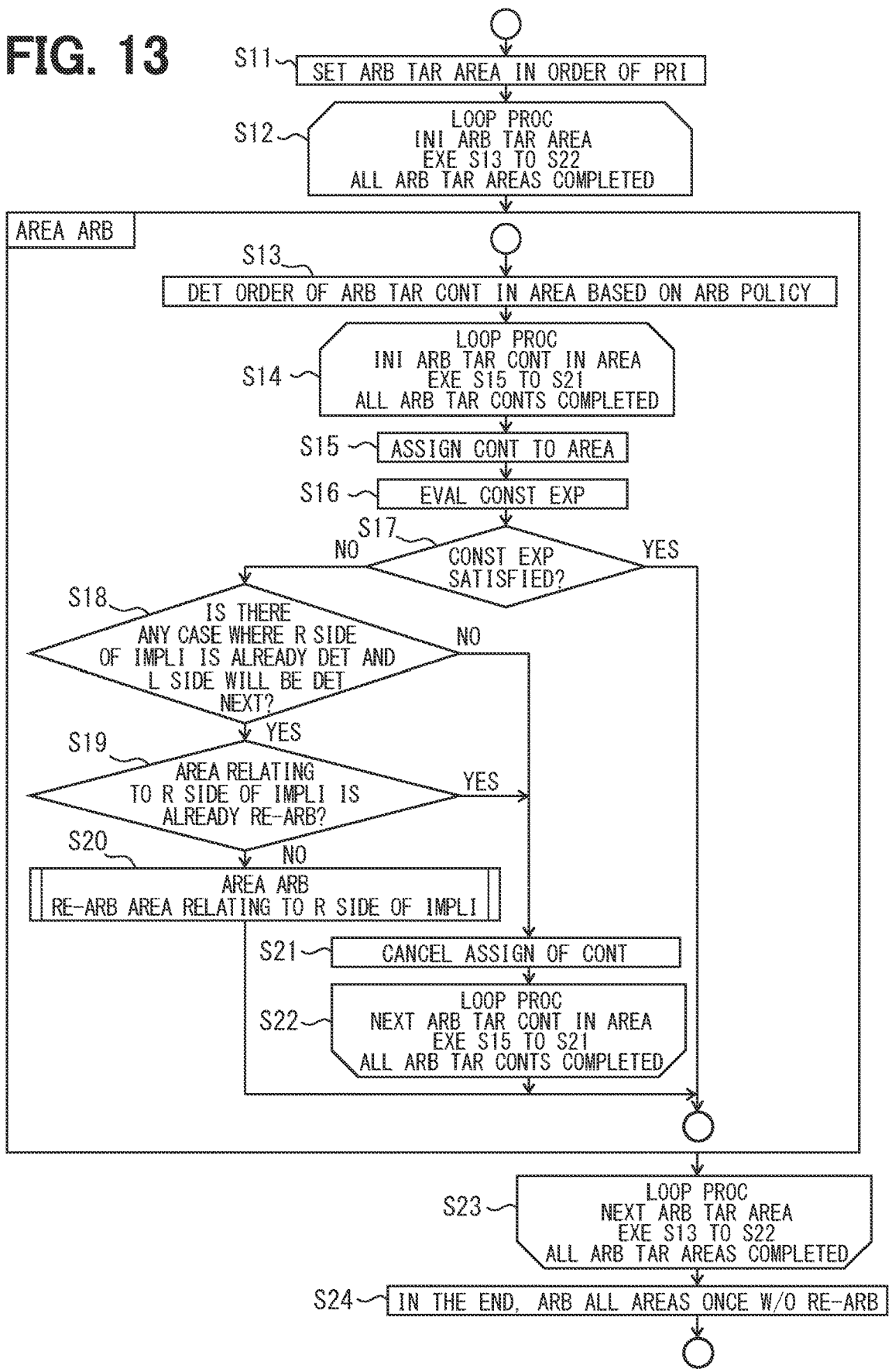
FIG. 13 is a flowchart showing an arbitration process.

As shown in FIG. 13, the display control device 10 selects an area as an arbitration target in descending order of priority (at S11), and if there is the arbitration target area (at S12), it proceeds to the area arbitration. In the area arbitration, the display control device 10 determines the order of contents as the arbitration target in the area based on the arbitration policy (at S13). If there is no arbitration target area, the loop ends. When there is the content as the arbitration target in the area (at S14), the display control device 10 assigns the content to the area (at S15). If there is no arbitration target area, the loop ends.

The display control device 10 evaluates the constraint expression (at S16), determines whether or not the constraint expression is satisfied (at S17), and exits the area arbitration when determining that the constraint expression is satisfied ("YES" at S17). When the display control device 10 determines that the constraint expression is not satisfied ("NO" at S17), it determines whether or not there is a case where the right side of the implication has already been determined and the left side is determined next (at S18). When the display control device 10 determines that there is a case ("YES" at S18), it determines whether or not the area related to the right side of the implication has already been re-arbitrated (at S19).

If the display control device 10 determines that there is no case ("NO" at S18), or if there is a case but determined that the area related to the right side of the implication has already been re-arbitrated ("YES" at S19), the device 10 cancels the assignment of the content (at S21), shifts to the arbitration target content in the next area (at S22), and exits the area arbitration.

On the other hand, when the display control device 10 determines that the area related to the right side of the implication has not been re-arbitrated yet ("NO" at S19), the display control device 10 adds the area related to the right side of the implication in the order following the arbitration target area (at S20). When the display control device 10 determines that all the loops for shifting to the next arbitration target area have ended and there is no arbitration target area (at S23), the display control device 10 arbitrates only once all the areas without re-arbitrating all the areas (at S24).

3. APP Request

Figure 14:
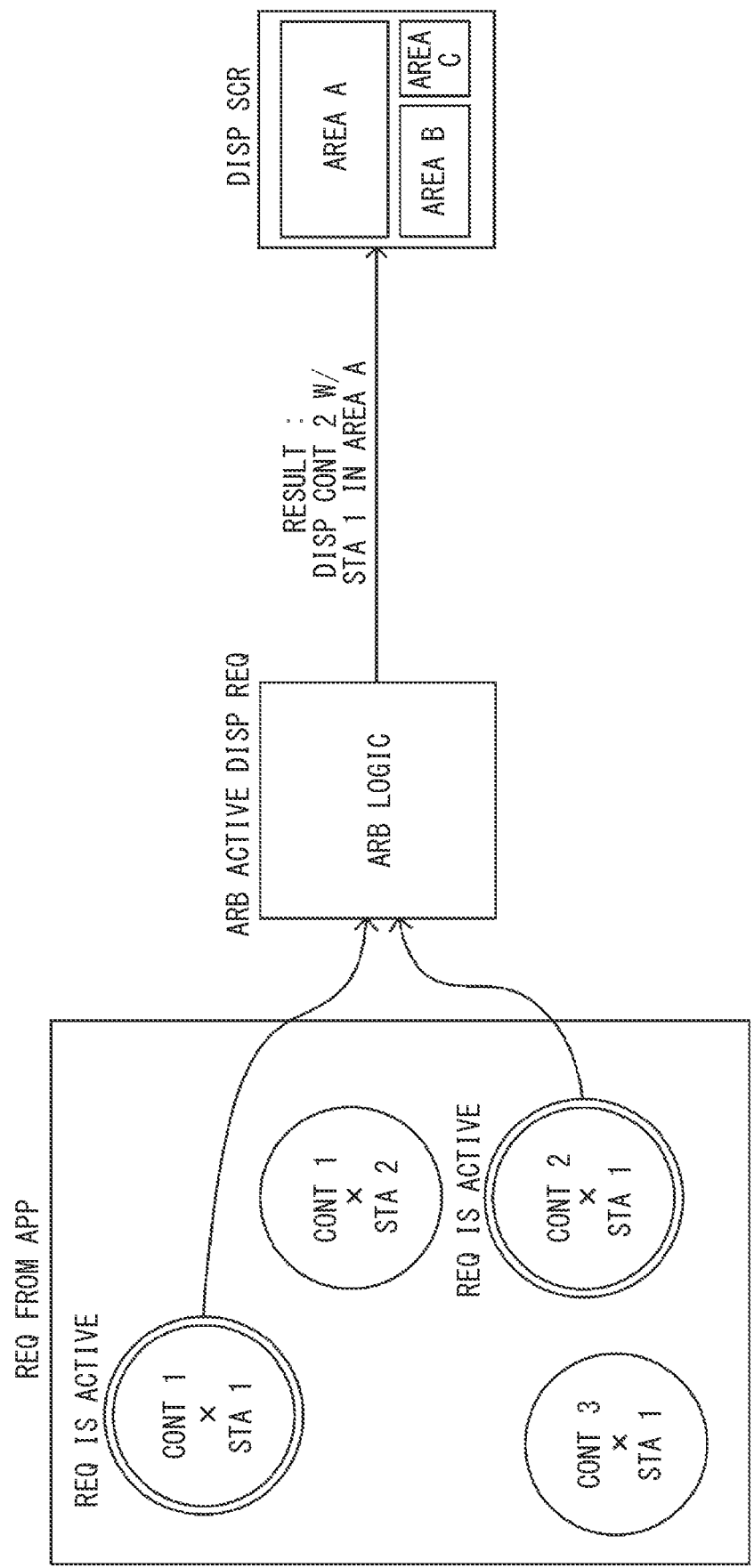
FIG. 14 is a diagram showing the concept of an APP request.

The APP request passes the value of the "content×state" to the arbitration logic as a request from the application, as shown in FIG. 14. The requests do not occur at the same time and always follow an order. It is also influenced to the post-processing that changes the state of the request after arbitration. The arbitration logic arbitrates for the content (and state) in which the APP request occurs. Therefore, the displayed content must at least output an APP request.

An APP request is an APP request for a content, and when an APP request occurs, the corresponding content is arbitrated and displayed in the area after satisfying the constraint expression. Specifically, an APP request is made, and areas to be arbitrated are selected in descending order of area priority. Next, arbitration is performed according to the arbitration policy of each area. That is, the content list is sorted according to the arbitration policy, in order of priority for priority arbitration, and in order of latter win for latter win arbitration.

Next, the content in the content list and the constraint expression are compared to determine whether the content can be displayed. The content not to be displayed is removed from the list. That is, a content is assigned and a constraint expression is evaluated. In this case, the constraint expressions are evaluated rather than compared, so if all are true, the content assignment is proper. The re-arbitration is performed when there is a possibility that it does not correspond to the intension since the constraint expression evaluation is false and the content assignment is not allowed. Next, display areas are assigned in order of the sorted content list, and the above process is repeated until there are no more areas to be arbitrated.

The timing of sort of the content list is before assigning the content to each area. The content list is created prior to each area assignment. Here, the content that can be displayed is determined for each area. Therefore, the content list is always sorted and filtered by constraint expressions prior to area assignment. That is, it is determined whether or not the area can be assigned.

Figure 15:
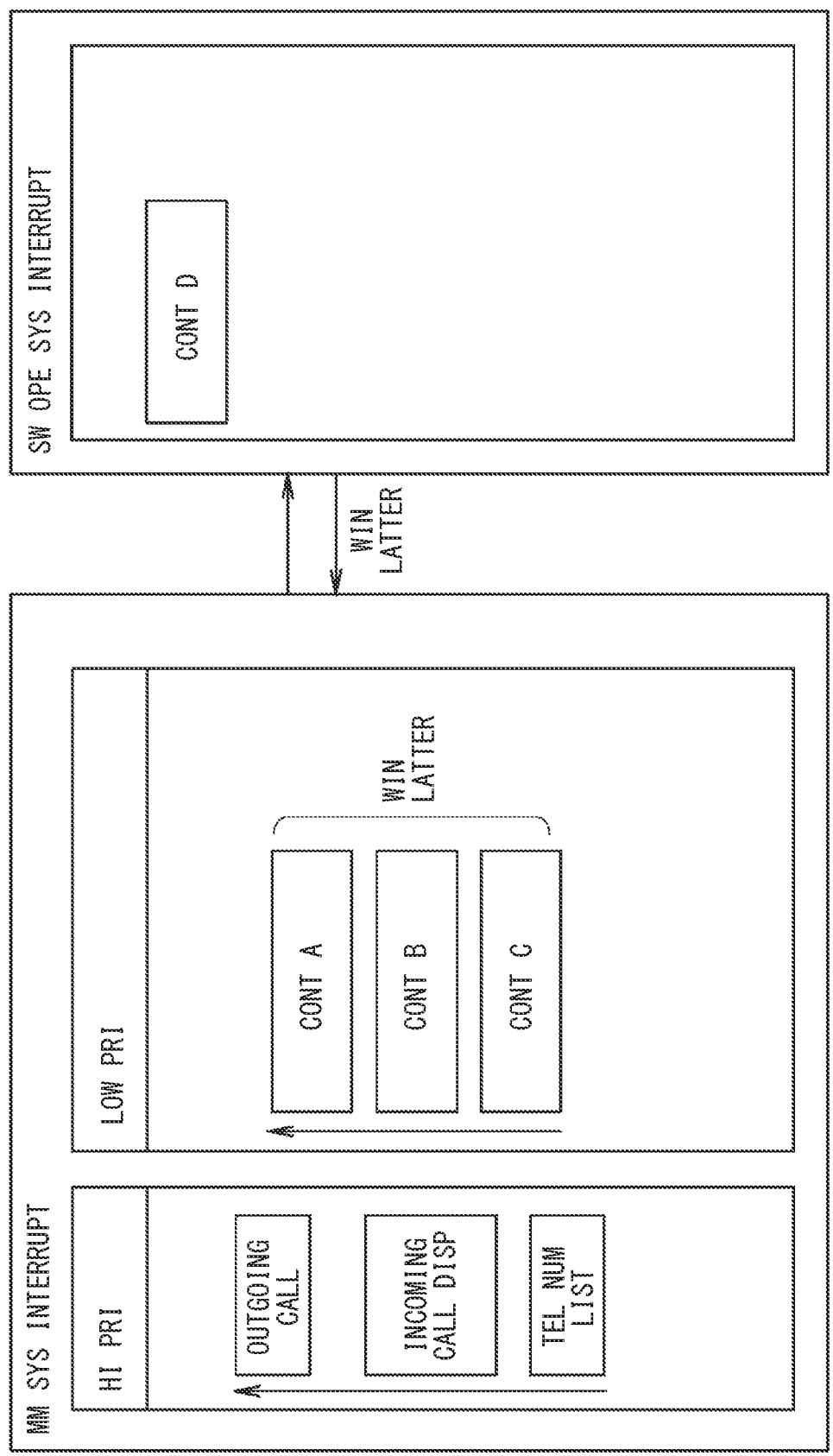
FIG. 15 is a diagram for explaining a case where content is assigned to one area.

Next, the case of arbitrating the content assigned to one area will be described. As shown in FIG. 15, an example case is described for a multimedia (MM) interrupt and an APP request interrupt for a switch (SW) operation. When the latter-win arbitration and the priority arbitration coexist, basically the latter-win arbitration has the priority, but TEL has the priority in the MM interrupt.

The constraint expression exemplifies "TEL. is Active ( )→For All MM interrupts (other than TEL) {x|!x. is Visible ( )}". This is a constraint that if TEL is active, no MM interrupts (other than TEL) are displayed. The TEL content can have three states of "calling", "incoming call display", and "TEL list", and the priority is changed in each state. The priority of the content with low priority is defined as "content A>content B>content C".

Content suppression means that no interrupt notification is given while content C is being displayed normally. The constraint exemplifies "center. displaying Content ( )=C.→!C notification. is Visible ( )". This is a constraint that if the content C is displayed in the central display area, the notification of the content C is not displayed. As described above, it is possible to display the content intended by the specification developer in one area.

Next, the case of arbitrating the content assigned to multiple areas will be described.

Figure 16:
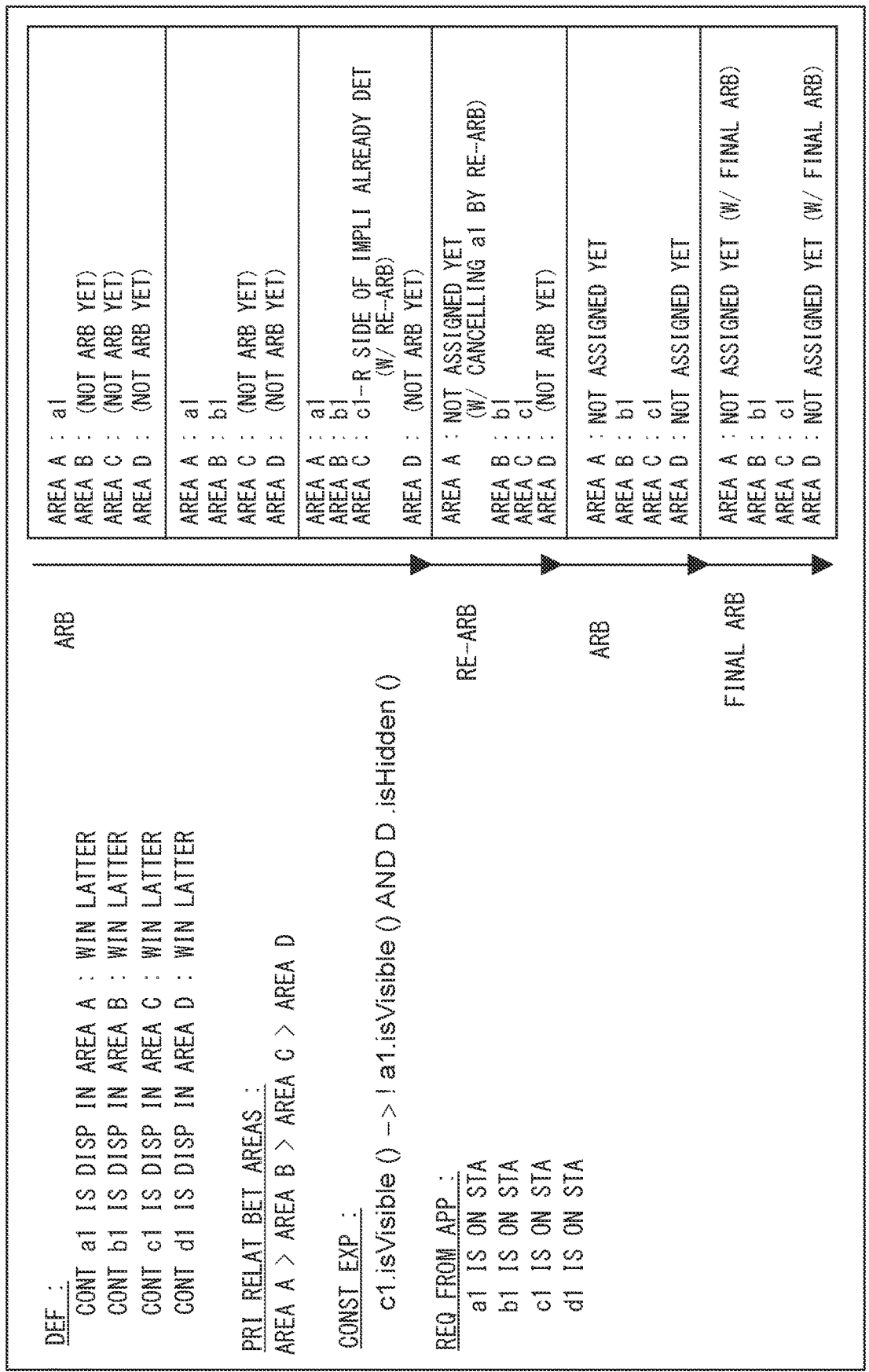
FIG. 16 is a diagram for explaining a case where content is assigned to a plurality of areas.

As shown in FIG. 16, area A can display content a1, area B can display content b1, area C can display content c1, and area D can display content d1. The arbitration policy is the latter-win arbitration for all areas A to C. The priority between areas is defined as "Area A>Area B>Area C>Area D".

Figure 17:
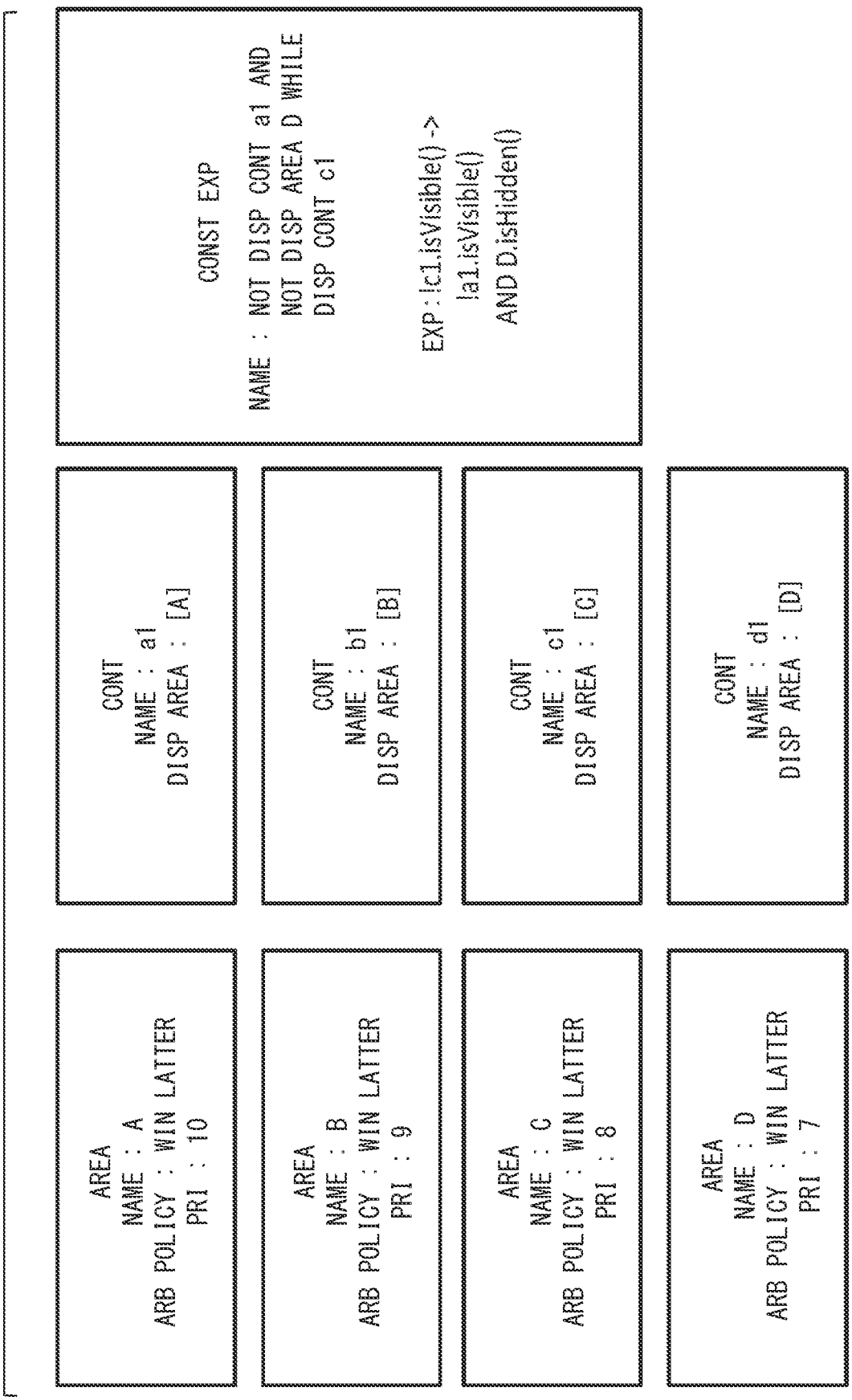
FIG. 17 is a diagram showing definitions of areas, contents, and constraint expressions.

The definition of area, content and constraint expression will be explained. As shown in FIG. 17, a name, arbitration policy, and priority are set for each area. A name and displayable area are set for each content. The constraint expression exemplifies "c1. is Visible ( )→!a1. is Visible ( ) AND D. is Hidden( )". The term "Is Hidden ( )" means that the area is not displayed even though there is assignable content in the area. This constraint expression describes the suppression that the content a1 is not displayed while the content c1 (i.e., in the area C) is being displayed, and the area D (which interferes with the area C) is hidden.

When the APP requests are turned on in the order of the content a1, the content b1, the content c1, and the content d1, arbitration is performed from area A in order. The content a1 is assigned to the area A according to the arbitration policy. but, this assignment is the tentative assignment since the determination of the constraint expression cannot be performed. Similarly, the content b1 is tentatively assigned to the area B.

In the arbitration in area C, the content c1 is assigned to the area C according to the arbitration policy, but the right side of the implication in the constraint expression becomes false first. This is because the AND operator will always provide false if one of the two is false.

Therefore, re-arbitration is performed with the content c1 tentatively assigned to the area C, and in the area A, the re-arbitration is performed so that the evaluation result of the constraint expression becomes true. There are two result patterns in which the evaluation result of the constraint expression is true. The result pattern 1 is that when the content c1 is displayed, the content a1 is not displayed and the area D is hidden. As for result pattern 2, if the content c1 is not displayed, the evaluation result of the constraint expression is true. The result pattern 1 corresponds to the intention by the specification developer, but the result pattern 2 is highly likely not to reflect the intention of the specification developer.

In this case, since the right side of the implication has already been determined and the left side is to be determined, re-arbitration is performed. The assignment of the content c1 to the area C is proper, and the re-arbitration in the area on the right side is performed. After the re-arbitration, the area D that has not been arbitrated is arbitrated by returning to the order of the original arbitration. In this case, the area D must be not displayed (i.e., unassigned) in order for the right side of the constraint expression to be true. After that, arbitration is performed only once at the end without re-arbitration. This is mainly arbitration for unassigned areas. As described above, it is possible to display the content intended by the specification developer in multiple areas.

Here, when the state of an area changes as a result of re-arbitration, the restrictions on the areas that have been restricted by the state before the re-arbitration of the re-arbitrated area are canceled. However, It may not be possible to obtain the results that take into account the cancelled restrictions, and the results intended by the specification developer may not be obtained. For this reason, in the present embodiment, when the state of the area changes due to the re-arbitration, the area that has been restricted by the state before the re-arbitration of the re-arbitrated area is arbitrated.

Upon receiving a display request from an application, the arbitration unit 13 arbitrates content according to rule definitions so as to satisfy rule-based arbitration (corresponding to the arbitration procedure. The display control unit 14 controls the display of the content assigned to the area by the arbitration of the content by the arbitration unit 13 (corresponding to an output control procedure). When the area is re-arbitrated, the arbitration unit 13 re-arbitrates the area specified as the influence area that influences due to the re-arbitration (corresponding to the re-arbitration procedure). The arbitration logic flow is illustrated below.

(1) Arbitration Logic Flow Example 1

A case where the definition, the visibility relationship between areas, the constraint expression, and the request generation order are set as the following conditions will be exemplified.

Definition:
  Area A can display content a;
  Area B can display content b; and
  Area C can display content c.

Visibility Relationship Between Areas:

Area A>Area B>Area C.

Constraint Expression:
1. A. is Displayed ( )→B. is Hidden ( ): "Do not display B when A is displayed".
2. C. is Displayed ( )→A. is Hidden ( ): "Do not display A when C is displayed".

Request Generation Order:
Display requests for the content a, the content b, and the content c are generated at the same time.

Figure 18:
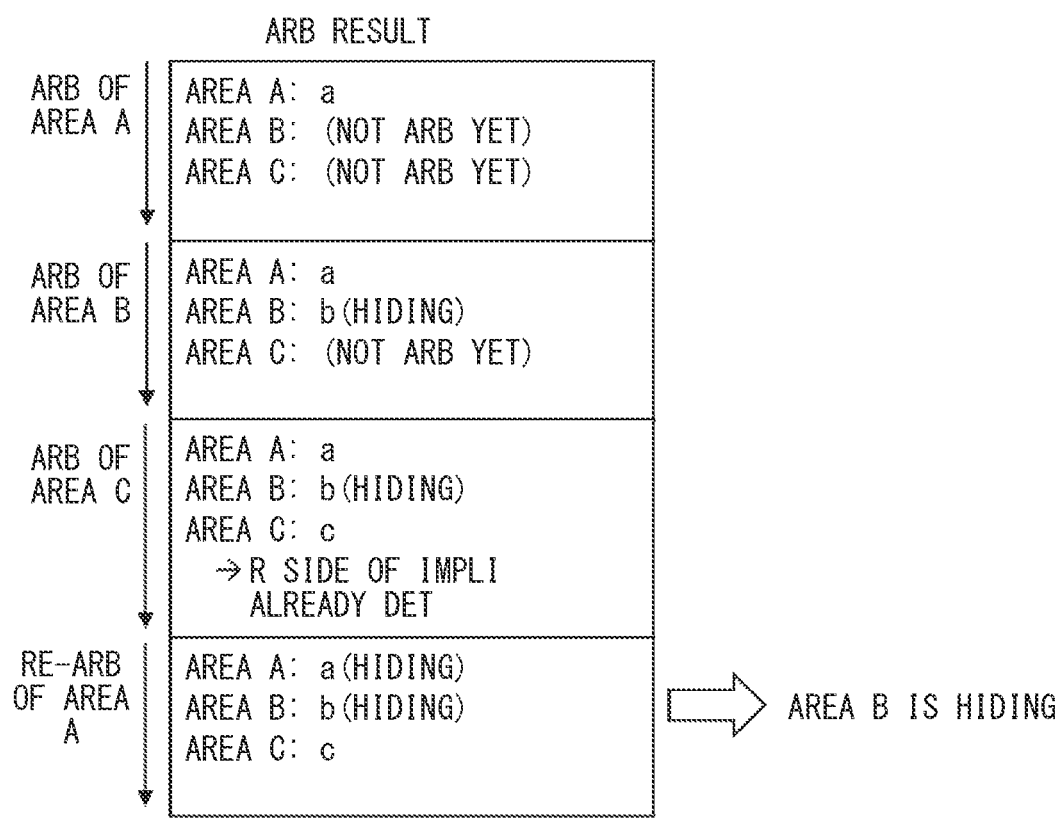
FIG. 18 is a diagram showing arbitration results.

In this case, as shown in FIG. 18, after the area C is arbitrated, the constraint expression 2 becomes false. Since the right side (i.e., area A) of constraint expression 2 has already been determined, the area A is re-arbitrated. When the area A is re-arbitrated, the area A is hidden, so the expected value indicates that the restriction of the area B that has been restricted by the area A in the constraint expression 1 is cancelled, and the content b is assigned to the area B. However, since no subsequent arbitration for the area B is performed after that, the area B remains hidden. Under such circumstances, after the state of the area changes, it is necessary to specify and arbitrate the area that has been restricted by the state of the re-arbitrated area before the re-arbitration. In the present embodiment, the following arbitration logic is performed.
1. Store evaluation results to specify the influence areas.
2. Analyze the evaluation results and specify the influence areas.
3. Store a list of influence areas in their areas.
4. Re-arbitrate the influence area after it has been arbitrated by a re-arbitration.

The influence area is defined as follows. An influence area is an area in which an area influences the state or an area in which the state of an area has been influenced. For example, in the constraint expression of "A. is Displayed ( )→!B. is Hidden ( )", if the area A suppresses the display of the area B, then the area A is the influence area and the area B is the influenced area. That is, when there is "a content A ON request and a content B ON request", the influence areas are the area A and the area B. Conversely, when there is not "a content A ON request and a content B ON request", the influence area does not exist.

Figure 19:
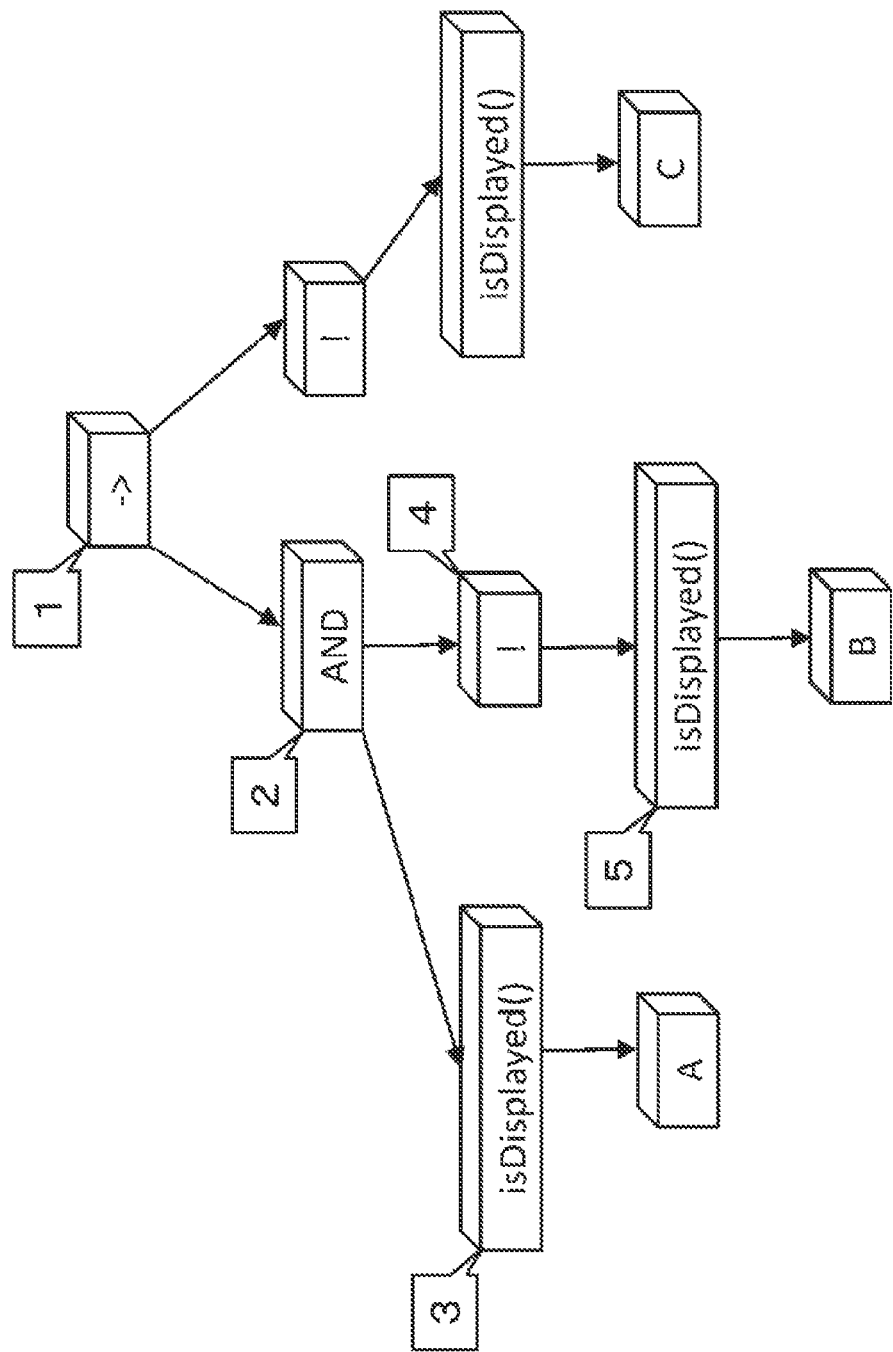
FIG. 19 is a diagram showing a tree structure.

The influence area is specified as follows. For example, in the constraint expression of "A. is Displayed ( ) AND !B. is Displayed ( )→!C. is Displayed ( )", the tree structure is shown in FIG. 19, the content 1 is assigned at the time of the arbitration of the area C, and the evaluation result of the constraint expression becomes false when the constraint expression is evaluated, so that the influence area is specified.

Procedure 1: Scan the area where the left side of "→" is set to true (i.e., the target area of the syntax whose evaluation result is true).
Procedure 2: Extract the area A.
Procedure 3: Invert the scan target by negation, and scan the target area of the syntax whose evaluation result is false.
Procedure 4: Extract the area B.

In the model illustrated in FIG. 18, the following re-arbitration of the influence areas is performed.
Procedure 1: Determine the content of the first area, i.e., the area A, by one-pass logic. As a result, the content a is assigned to the area A. The evaluation of the constraint expression is skipped because there is an unassigned area on the right side.
Procedure 2: Determine the content of the next area, i.e., the area B, by one-pass logic.
Procedure 2-1: Tentatively assign the content b to the area B.
Procedure 2-2: Evaluate the constraint expression 1 of "A. is Displayed ( )→!B. is Displayed ( )".
Procedure 2-3: The constraint expression becomes "true→false", and the evaluation result of the constraint expression becomes false.
Procedure 2-4: Since the evaluation result of the constraint expression is false, the area B under arbitration is registered in the influence area A.
Procedure 2-5: Cancel the assignment of the content C and end with no content assigned to the area B.
Procedure 3: Determine the content of the next area, i.e., the area C, by one-pass logic.
Procedure 3-1: The content C is tentatively assigned to the area C.
Procedure 3-2: Evaluate the constraint expression 2 of "C. is Displayed ( )→!A. is Displayed ( )".
Procedure 3-3: The constraint expression becomes "true→false", and the evaluation result of the constraint expression becomes false.
Procedure 3-4: Since the right side of the implication (i.e., the area A) has already been arbitrated, the area A is re-arbitrated. Specifically, the assignment of the content C is determined as proper, and the assignment of the content in area A is performed again.
Procedure 4: Determine the content of the area A, which is the next area (i.e., re-arbitration).
Procedure 4-1: Tentatively assign the content a to the area A.
Procedure 4-2: The constraint expression becomes "true→false", and the evaluation result of the constraint expression becomes false.
Procedure 4-3: Since the evaluation result of the constraint expression is false, the area A under arbitration is registered in the influence area C.
Procedure 4-4: Cancel the tentative assignment of the content a and end with no content assigned to the area A. At this stage, the content is not assigned to the areas A and B, and the content c is assigned to the area C. Since the area A has been re-arbitrated, the area B influenced by the area A is re-arbitrated. Specifically, it is determined that the assignment of no content in the area A is proper, and the content in area B is assigned again.
Procedure 5: Determine the content of the area B, which is the next area (i.e., re-arbitration of the influenced area).
Procedure 5-1: Tentatively assign the content b to the area B.
Procedure 5-2: The constraint expression becomes "false→false", and the evaluation result of the constraint expression becomes true.
Procedure 5-3: As a result, the content b is assigned to the area B.

Figure 20:
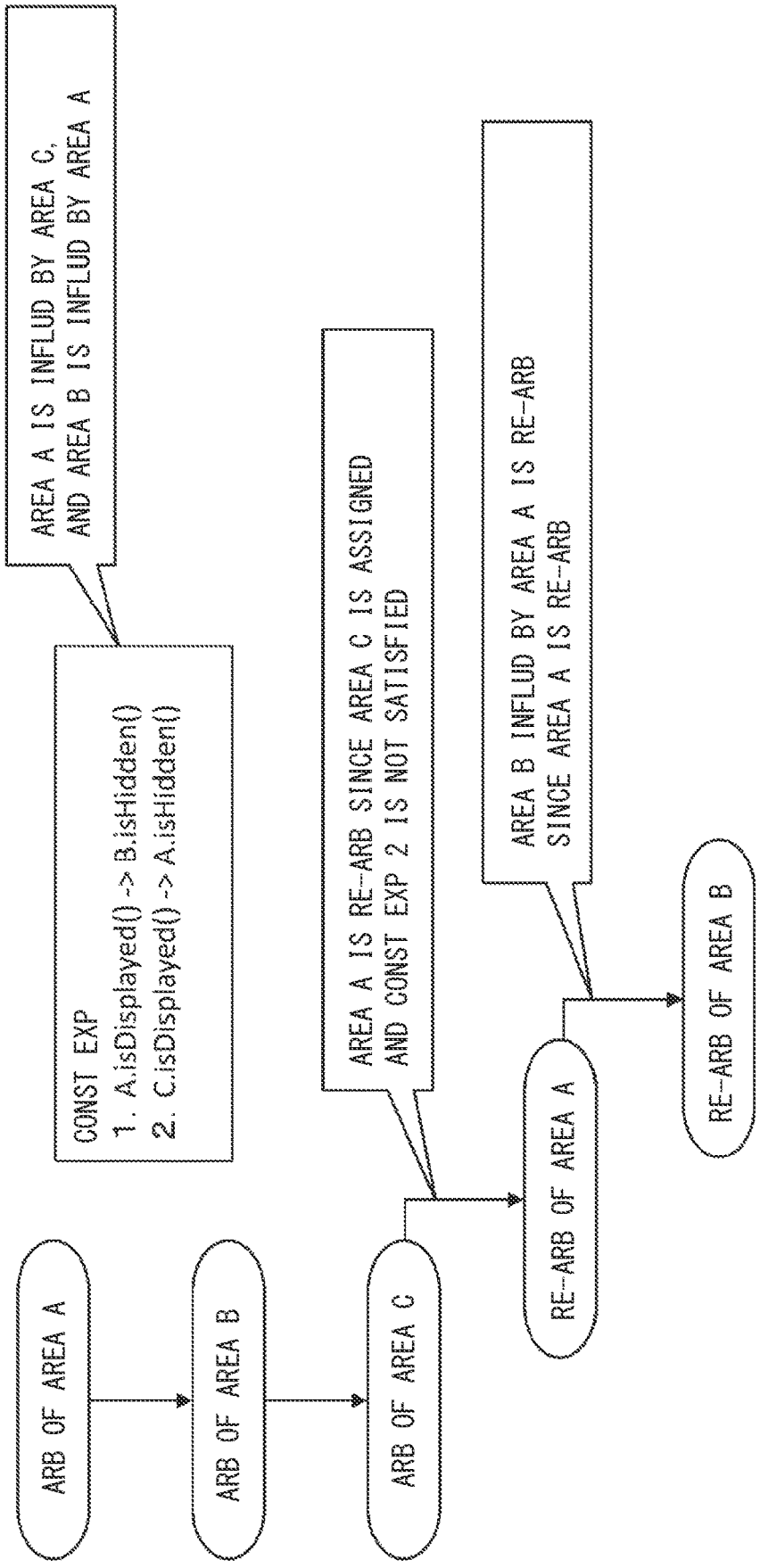
FIG. 20 is a diagram showing a flow of re-arbitration.

As described above, as shown in FIG. 20, the arbitration for the area A, the arbitration for the area B, the arbitration for the area C, the re-arbitration for the area A, and the re-arbitration for the area B, which is an influenced area, are sequentially performed. As a result, as shown in FIG. 21, while the content c is displayed in the area C, the assignment of the content of the area A is eliminated, and the restriction of the area A is eliminated, so that the content b is assigned to the area B, and the result intended by the specification developer can be obtained.

Figure 23:
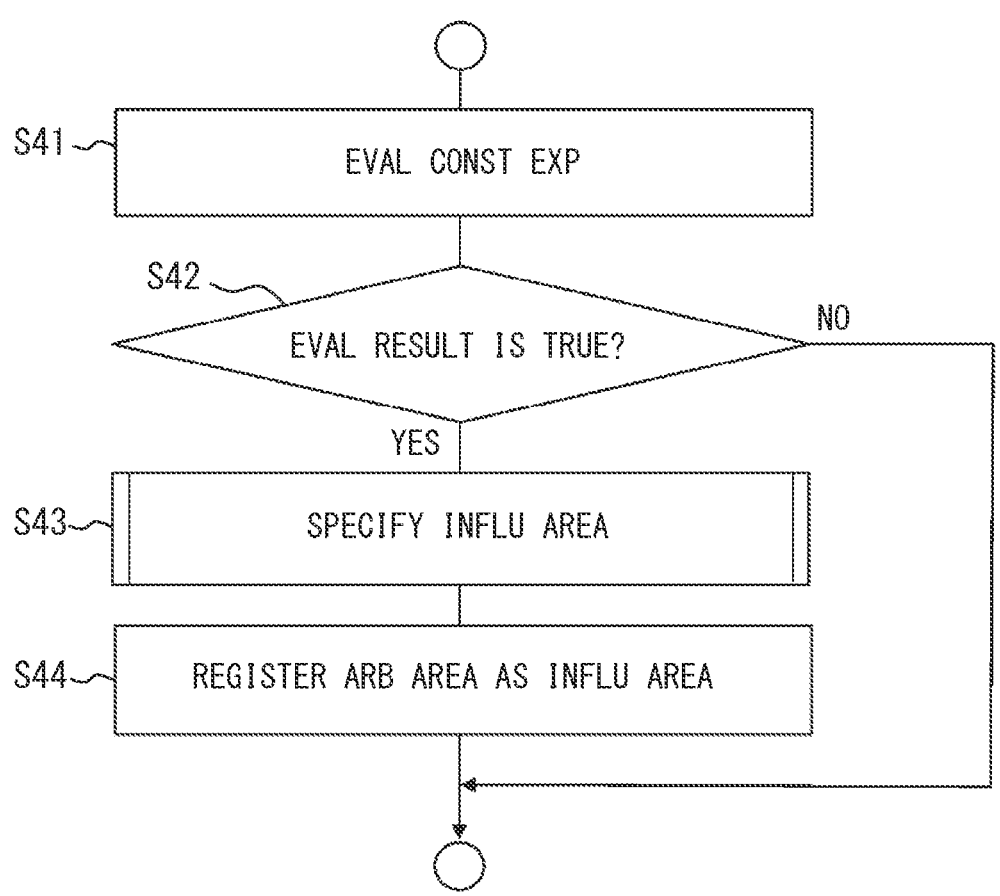
FIG. 23 is a flowchart (part 2) showing an area registration process during the arbitration.

The display control device 10 performs the area registration process during the arbitration shown in FIGS. 22 and 23 to register the influence area in the arbitrating area. When the area registration process during the arbitration is started, the display control device 10 clears the already arbitrated flag of the arbitration target area (at S31). The display control device 10 determines whether or not the already arbitrated flag is in an un-arbitrated area (at S32), and when it is determined that the already arbitrated flag is not in an un-arbitrated area ("NO" at S32), the area registration process during the arbitration ends.

On the other hand, when the display control device 10 determines that the already arbitrated flag is in the un-arbitrated area ("YES" at S32), it assigns the content to the area (at S33), and shifts to the constraint expression evaluation process for evaluating the constraint expression according to the list of constraint expressions related to content assignment (at S34).

When starting the constraint expression evaluation process, the display control device 10 evaluates the constraint expression (at S41), and determines whether or not the evaluation result of the constraint expression is true (at S42). When the display control device 10 determines that the evaluation result of the constraint expression is true ("YES" at S42), it specifies the influence area (at S43), registers the area under arbitration in the influence area (at S44), and the constraint expression evaluation process ends.

After completing the constraint expression evaluation process, the display control device 10 determines whether or not the evaluation result of the constraint expression is true (at S35). When the display control device 10 determines that the evaluation result of the constraint expression is not true but false ("NO" at S35), it returns to step S33 and repeats step S33 and subsequent steps. When the display control device 10 determines that the evaluation result of the constraint expression is true ("YES" at S35), it updates the hidden of the area under arbitration (at S36), and shifts to the constraint expression evaluation process for evaluating the constraint expression according to the list of constraint expressions relating to the hidden state (at S37).

When starting the constraint expression evaluation process, the display control device 10 evaluates the constraint expression (at S41), and determines whether or not the evaluation result of the constraint expression is true (at S42). When the display control device 10 determines that the evaluation result of the constraint expression is true ("YES" at S42), it specifies the influence area (at S43), registers the area under arbitration in the influence area (at S44), and the constraint expression evaluation process ends.

After completing the constraint expression evaluation process, the display control device 10 determines whether or not the evaluation result of the constraint expression is true (at S38). When the display control device 10 determines that the evaluation result of the constraint expression is not true but false ("NO" at S38), it returns to step S36 and repeats step S36 and subsequent steps. When the display control device 10 determines that the evaluation result of the constraint expression is true ("YES" at S38), it determines whether or not the area being arbitrated has been changed by arbitration (at S39).

When the display control device 10 determines that the area being arbitrated has not changed by arbitration ("NO" at S39), the display control device 10 returns to step S36, and repeats step S36 and subsequent steps. When the display control device 10 determines that the area being arbitrated has changed by arbitration ("YES" at S39), it updates the influence area (at S40), returns to step S32, and repeats step S32 and subsequent steps. In the arbitration area registration process described above, the influence area may be specified by analyzing the evaluation result of evaluating the constraint expression before accepting the display request from the application.

(2) Arbitration Logic Flow Example 2

A case where the definition, the visibility relationship between areas, the constraint expression, and the request generation order are set as the following conditions will be exemplified.

Definition:
  Area A can display content a1;
  Area B can display content b1;
  Area C can display contents c1 and c2; and
  Area D can display content d1.
Visibility relationship between areas:
  Area A>Area B>Area C>Area D.

Constraint Expression:
  1. A. is Displayed ( )→!c2. is Visible ( ): "Do not display c2 while displaying A".
  2. c1. is Visible ( )→B. is Hidden( ): "Do not display B while displaying c1".
  3. D. is Displayed ( )→A. is Hidden ( ): "Do not display A when D is displayed".

Request Generation Order:
  Display requests are generated in the order of the content a1, the content b1, the content c1, the content c2, and the content d1.

In this case, as shown in FIG. 24, the arbitration of the area A, the arbitration of the area B, the arbitration of the area C, the re-arbitration of the area B, the arbitration of the area D, the re-arbitration of the area A, the re-arbitration of the area C as the influence area, and the re-arbitration of the area B, which is the influenced area, are performed sequentially.

Figure 25:
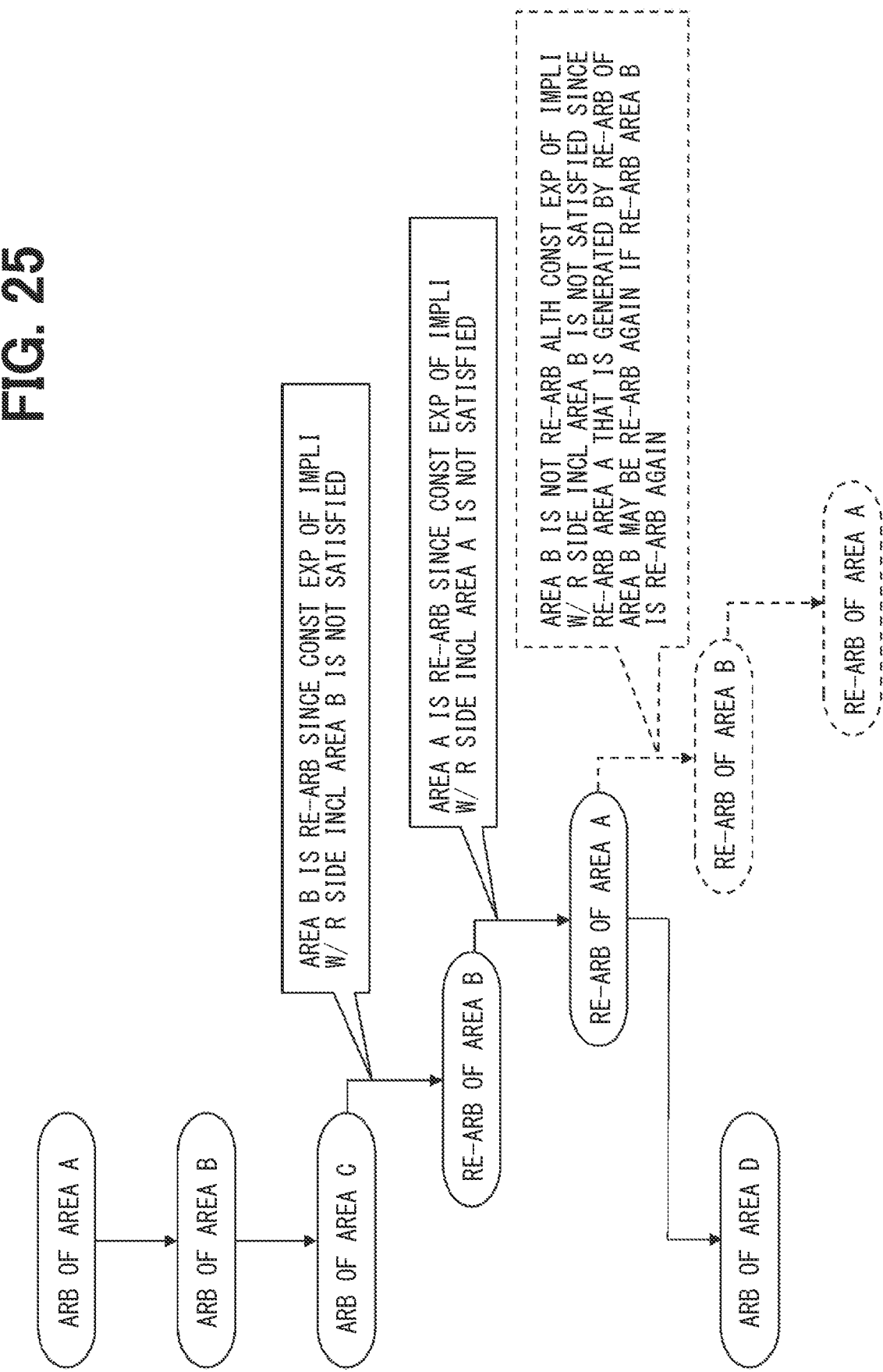
FIG. 25 is a diagram showing a flow of re-arbitration.

As shown in FIGS. 25 and 26, the same area is re-arbitrated only once during the re-arbitration so as not to cause an infinite loop.

A case where the definition, the visibility relationship between areas, the constraint expression, and the request generation order are set as the following conditions will be exemplified.

Definition:
  Area A can display content a;
  Area B can display content b; and
  Area C can display content c.
Visibility Relationship Between Areas:
  Area A>Area B>Area C.

Constraint Expression:
  1. A. is Displayed ( )→B. is Hidden ( ): "Do not display B when A is displayed".
  2. B. is Displayed ( )→C. is Hidden ( ): "Do not display C when B is displayed".
  3. C. is Displayed ( )→A. is Hidden ( ): "Do not display A when C is displayed".

Request Generation Order:
  Display requests occur in the order of the content a, the content b, and the content c.

If the area A, which is the source area of re-arbitration, is influenced by the area C, which is being arbitrated, the re-arbitration of the influence area is performed by excluding the area A from the target of re-arbitration. That is, the re-arbitration of the area specified as the influence area is performed only once.

According to the present embodiment, the following effects can be exhibited. In the display control device 10, when the re-arbitration of areas is performed, the re-arbitration of an area specified as an influence area, which gives the influence according to the performance of the re-arbitration, is performed. The restriction of the area that has been restricted by the state before re-arbitration is eliminated, and a result that takes into account the eliminated restrictions can be obtained. As a result, when the state of the area changes due to the re-arbitration, the result intended by the specification developer can be appropriately obtained.

By analyzing the evaluation result of evaluating the constraint expression and specifying the influence area before receiving the display request from the application, the processing time after receiving the display request from the application can be shortened.

The re-arbitration of the area specified as the influence area is performed only once. It is possible to avoid a situation in which re-arbitration never ends, thereby avoiding the occurrence of an infinite loop.

Although the present disclosure has been made in accordance with the embodiments, it is understood that the present disclosure is not limited to such embodiments and structures. The present disclosure incorporates various modifications and variations within a scope of equivalents. Additionally, various combinations and configurations, as well as other combinations and configurations including more, less, or only a single element, are within the scope and spirit of the present disclosure.

It may be applied not only to the vehicle but also to the content display control device for purposes other than the vehicle.

The controller and the method according to the present disclosure may be achieved by a dedicated computer provided by constituting a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured by one or more hardware logic circuits. The computer program may also be stored on a computer readable non-transitory tangible recording medium as instructions to be executed by a computer.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A content output control device comprising:
   a memory that stores rule definitions including: arbitration policies for defining basic arbitration when a plurality of contents are assigned to be displayed in a plurality of display areas or a plurality of display zones; and a constraint expression;
   an arbitration unit that arbitrates the display of the plurality of contents according to the rule definitions to satisfy a rule-based arbitration upon receiving an output request from an application; and
   an output control unit that controls display of the plurality of contents in the plurality of display areas or the plurality of display zones due to an arbitration of the plurality of contents by the arbitration unit, wherein:
   when one of the plurality of display areas or the plurality of display zones is re-arbitrated, the arbitration unit re-arbitrates a different one of the plurality of display areas specified as an influence area that influences the one of the plurality of display areas due to a re-arbitration thereof, or a different one of the plurality of display zones specified as an influence zone that influences the one of the plurality of display zones due to a re-arbitration thereof;
   wherein:
   a particular display area influences an additional display area, and the additional display area is influenced by the particular display area, when a state of content being displayed in the particular display area suppresses a state of content being displayed in the additional display area based on arbitration according to a particular arbitration policy of the rule definitions related to the particular display area and the additional display area, with the particular display area and the additional display area each being an influence area due to the arbitration; and
   a particular display zone influences an additional display zone, and the additional display zone is influenced by the particular display zone, when a state of content being displayed in the particular display zone suppresses a state of content being displayed in the additional display zone based on arbitration according to a particular arbitration policy of the rule definitions related to the particular display zone and the additional display zone, with the particular display zone and the additional display zone each being an influence zone due to the arbitration.

2. The content output control device according to claim 1, wherein:
   the arbitration unit analyzes an evaluation result of evaluating a constraint expression to specify the influence area or the influence zone.

3. The content output control device according to claim 2, wherein:
   the arbitration unit analyzes an evaluation result of evaluating a constraint expression and specifies the influence area or the influence zone before receiving the output request from the application.

4. The content output control device according to claim 1, wherein:
   the arbitration unit re-arbitrates the area specified as the influence area or the zone specified as the influence zone only once.

5. The content output control device according to claim 1, further comprising:
   one or more processors, wherein:
   the one or more processors provides at least one of: the arbitration unit; and the output control unit.

6. A content output control method in a content output control device having a memory for storing rule definitions including: arbitration policies defining basic arbitration when a plurality of contents are assigned to be displayed in a plurality of display areas or a plurality of display zones; and a constraint expression, the content output control method comprising:

an arbitration procedure for arbitrating the display of the plurality of contents according to the rule definitions to satisfy a rule-based arbitration upon receiving an output request from an application;

an output control procedure for controlling display of the plurality of contents in the plurality of display areas or the plurality of display zones due to an arbitration of the plurality of contents in the arbitration procedure; and a re-arbitration procedure for re-arbitrating a different one of the plurality of display areas specified as an influence area that influences one of the plurality of display areas due to a re-arbitration thereof, or a different one of the plurality of display zones specified as an influence zone that influences one of the plurality of display zones due to a re-arbitration thereof when the one of the plurality of display areas or the plurality of display zones is re-arbitrated;

wherein:

a particular display area influences an additional display area, and the additional display area is influenced by the particular display area, when a state of content being displayed in the particular display area suppresses a state of content being displayed in the additional display area based on arbitration according to a particular arbitration policy of the rule definitions related to the particular display area and the additional display area, with the particular display area and the additional display area each being an influence area due to the arbitration; and a particular display zone influences an additional display zone, and the additional display zone is influenced by the particular display zone, when a state of content being displayed in the particular display zone suppresses a state of content being displayed in the additional display zone based on arbitration according to a particular arbitration policy of the rule definitions related to the particular display zone and the additional display zone, with the particular display zone and the additional display zone each being an influence zone due to the arbitration.

7. A non-transitory tangible computer readable storage medium comprising instructions being executed by a computer, the instructions causing a content output control device, having a memory for storing rule definitions including: arbitration policies defining a basic arbitration when a plurality of contents are assigned to be displayed in a plurality of display areas or a plurality of display zones; and a constraint expression, to execute:

an arbitration procedure for arbitrating the display of the plurality of contents according to the rule definitions to satisfy a rule-based arbitration upon receiving an output request from an application;

an output control procedure for controlling display of the plurality of contents in the plurality of display areas or the plurality of display zones due to an arbitration of the plurality of contents in the arbitration procedure; and a re-arbitration procedure for re-arbitrating a different one of the plurality of display areas specified as an influence area that influences one of the plurality of display areas due to a re-arbitration thereof, or a different one of the plurality of display zones specified as an influence zone that influences one of the plurality of display zones due to a re-arbitration thereof when the one of the plurality of display areas or the plurality of display zones is re-arbitrated;

wherein:

a particular display area influences an additional display area, and the additional display area is influenced by the particular display area, when a state of content being displayed in the particular display area suppresses a state of content being displayed in the additional display area based on arbitration according to a particular arbitration policy of the rule definitions related to the particular display area and the additional display area, with the particular display area and the additional display area each being an influence area due to the arbitration; and a particular display zone influences an additional display zone, and the additional display zone is influenced by the particular display zone, when a state of content being displayed in the particular display zone suppresses a state of content being displayed in the additional display zone based on arbitration according to a particular arbitration policy of the rule definitions related to the particular display zone and the additional display zone, with the particular display zone and the additional display zone each being an influence zone due to the arbitration.

\* \* \* \* \*